(12) United States Patent
Oka et al.

(10) Patent No.: US 11,968,444 B2
(45) Date of Patent: Apr. 23, 2024

(54) CONTROL APPARATUS APPLIED TO IMAGE PICKUP SYSTEM, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventors: Azusa Oka, Kanagawa (JP); Mitsuru Tada, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 20 days.

(21) Appl. No.: 18/061,089

(22) Filed: Dec. 2, 2022

(65) Prior Publication Data
US 2023/0179730 A1    Jun. 8, 2023

(30) Foreign Application Priority Data

Dec. 7, 2021 (JP) ................................. 2021-198716
Nov. 11, 2022 (JP) ................................. 2022-180932

(51) Int. Cl.
*H04N 23/663*   (2023.01)
*G06V 10/56*    (2022.01)
(Continued)

(52) U.S. Cl.
CPC .......... *H04N 23/663* (2023.01); *G06V 10/56* (2022.01); *G06V 10/761* (2022.01);
(Continued)

(58) Field of Classification Search
CPC .. H04N 23/663; H04N 23/617; H04N 23/631; H04N 23/84; H04N 1/6083;
(Continued)

(56) References Cited

U.S. PATENT DOCUMENTS 5,453,853 A * 9/1995 Sakai .................. H04N 1/6055
358/506
9,300,935 B2 * 3/2016 Kano .................. H04N 23/663
(Continued)

FOREIGN PATENT DOCUMENTS

JP    2020-047082 A    3/2020

*Primary Examiner* — Chiawei Chen
(74) *Attorney, Agent, or Firm* — Cowan, Liebowitz & Latman, P.C.

(57) ABSTRACT

A control apparatus capable of setting a suitable correction parameter while reducing user's troublesome. The control apparatus including a database that holds correction parameters for correcting pickup images to reduce color difference between pickup images of image pickup apparatuses in association with combinations of standard image pickup apparatus information and image pickup conditions of image pickup apparatuses, a memory device that stores instructions, and a processor that executes the instructions to obtain first information showing a standard image pickup apparatus at a present time and second information showing a target image pickup apparatus that picks up an image as a correction target at the present time, obtain the image pickup conditions of the image pickup apparatuses, determine a setting correction parameter that is set to the target image pickup apparatus from the database based on the first information and the image pickup conditions apparatuses, and output the setting correction parameter.

20 Claims, 16 Drawing Sheets

(51) Int. Cl.
    *G06V 10/74*    (2022.01)
    *H04N 23/617*   (2023.01)
    *H04N 23/63*    (2023.01)
    *H04N 23/84*    (2023.01)

(52) U.S. Cl.
    CPC ......... *H04N 23/617* (2023.01); *H04N 23/631* (2023.01); *H04N 23/84* (2023.01)

(58) Field of Classification Search
    CPC .... H04N 1/6086; H04N 1/6055; G06V 10/56; G06V 10/761
    See application file for complete search history.

(56)           References Cited

U.S. PATENT DOCUMENTS

| | | | |
|---|---|---|---|
| 10,055,822 B2* | 8/2018 | Matsushita | ................ G06T 5/73 |
| 2005/0052546 A1* | 3/2005 | Nakabayashi | ......... H04N 9/643 |
| | | | 348/E9.04 |
| 2007/0120984 A1* | 5/2007 | Nakabayashi | ....... H04N 1/6086 |
| | | | 348/222.1 |
| 2010/0067030 A1* | 3/2010 | Imai | ..................... H04N 1/6086 |
| | | | 358/1.9 |
| 2011/0026824 A1* | 2/2011 | Ishii | ..................... G06T 11/001 |
| | | | 382/167 |
| 2013/0176598 A1* | 7/2013 | Ishii | ..................... H04N 1/6097 |
| | | | 358/2.1 |
| 2013/0195357 A1* | 8/2013 | Ishii | ..................... G06T 11/001 |
| | | | 382/167 |
| 2014/0022411 A1* | 1/2014 | Kano | ..................... H04N 23/66 |
| | | | 348/224.1 |
| 2016/0364883 A1* | 12/2016 | Shiiyama | ............... H04N 5/262 |
| 2017/0116714 A1* | 4/2017 | Matsushita | ............... G06T 5/73 |

* cited by examiner

FIG. 3

| Rin | Gin | Bin | Rout | Gout | Bout |
|---:|---:|---:|---:|---:|---:|
| 0 | 0 | 0 | 0 | 0 | 0 |
| 0 | 0 | 1 | 0 | 2 | 3 |
| ... | ... | ... | ... | ... | ... |
| 0 | 0 | 255 | 10 | 15 | 243 |
| 0 | 1 | 0 | 0 | 3 | 1 |
| 0 | 1 | 1 | 0 | 4 | 6 |
| ... | ... | ... | ... | ... | ... |
| 0 | 1 | 255 | 8 | 23 | 254 |
| 0 | 2 | 0 | 2 | 10 | 2 |
| 0 | 2 | 1 | 2 | 12 | 5 |
| ... | ... | ... | ... | ... | ... |
| 0 | 255 | 255 | 13 | 245 | 252 |
| 1 | 0 | 0 | 2 | 1 | 1 |
| 1 | 0 | 1 | 2 | 1 | 2 |
| ... | ... | ... | ... | ... | ... |
| 255 | 255 | 255 | 243 | 252 | 246 |

FIG. 4

| | Standard image pickup apparatus | Image pickup conditions | | | | | | | | | |
|---|---|---|---|---|---|---|---|---|---|---|---|
| | | Image pickup apparatus A100 | | Lens A10 | | Illumination environment color temperature of image pickup apparatus A100 | Image pickup apparatus B200 | | Lens B20 | | Illumination environment color temperature of image pickup apparatus B200 |
| | | Model number | Serial number | Model number | Serial number | | Model number | Serial number | Model number | Serial number | |
| LUT1 | Image pickup apparatus A100 | CAM-1 | CAMCL-11 | L-1 | LCL-11 | 6000K | CAM-1 | CAMCL-12 | L-1 | LCL-12 | 6000K |
| LUT2 | Image pickup apparatus A100 | CAM-1 | CAMCL-11 | L-1 | LCL-11 | 6000K | CAM-1 | CAMCL-12 | L-2 | LCL-21 | 6000K |
| LUT3 | Image pickup apparatus A100 | CAM-1 | CAMCL-11 | L-1 | LCL-11 | 3000K | CAM-1 | CAMCL-12 | L-1 | LCL-12 | 3000K |
| LUT4 | Image pickup apparatus A100 | CAM-1 | CAMCL-11 | L-1 | LCL-11 | 6000K | CAM-2 | CAMCL-21 | L-1 | LCL-12 | 6000K |
| LUT5 | Image pickup apparatus B200 | CAM-1 | CAMCL-11 | L-1 | LCL-11 | 6000K | CAM-1 | CAMCL-12 | L-1 | LCL-12 | 6000K |

FIG. 7

Please put a check mark on a check box for an image pickup apparatus that is a target of color/luminance correction.
Please put a check mark on a check box for an image pickup apparatus that is a standard of color/luminance.

| Color/luminance correction target | Color/luminance standard | Image pickup apparatus ||
| --- | --- | --- | --- |
| | | Model number | Serial number |
| ☑ | ☑ | CAM-1 | CAMCL-11 |
| ☑ | ☐ | CAM-1 | CAMCL-12 |

Return | Next

FIG. 10

| Standard image pickup apparatus | Image pickup apparatus A100 Chart extraction image | Image pickup apparatus B200 Chart extraction image |
|---|---|---|
| LUT1 | Image pickup apparatus A100 | 1101 | 1102 |
| LUT2 | Image pickup apparatus A100 | 1103 | 1104 |
| LUT3 | Image pickup apparatus B200 | 1101 | 1102 |
| LUT4 | Image pickup apparatus B200 | 1103 | 1104 |

FIG. 12

Please put a check mark on a check box for an image pickup apparatus that is a target of color/luminance correction.
Please put a check mark on a check box for an image pickup apparatus that is a standard of color/luminance.

| Color/luminance correction target | Color/luminance standard | IP address |
|---|---|---|
| ☑ | | 192.168.254.251 |
| ☑ | ☑ | 192.168.254.252 |
| ☐ | ☐ | 192.168.254.253 |
| ☐ | ☐ | 192.168.254.254 |

Return  Next

FIG. 13A

| Standard image pickup apparatus | Image pickup apparatus A100 | | Lens A10 | | Image pickup conditions | | | | | | |
|---|---|---|---|---|---|---|---|---|---|---|---|
| | Model number | Serial number | Model number | Serial number | Illumination environment color temarature of image pickup apparatus A100 | Light source type of image pickup apparatus A100 | Image pickup time zone of image pickup apparatus A100 | Image pickup month/year of image pickup apparatus A100 | Image pickup location of image pickup apparatus A100 | Important color of image pickup apparatus A100 | Pickup object type of image pickup apparatus A100 |
| Image pickup apparatus A100 | CAM-1 | CAMCL-11 | L-1 | LCL-11 | 6000K | LED | Daytime | April, 2021 | Tokyo | Flesh color | Person |
| Image pickup apparatus A100 | CAM-1 | CAMCL-11 | L-1 | LCL-11 | 6000K | LED | Daytime | April, 2021 | Tokyo | Flesh color | Person |
| Image pickup apparatus A100 | CAM-1 | CAMCL-11 | L-1 | LCL-11 | 3000K | Halogen lamp | Evening | April, 2021 | Tokyo | Flesh color | Person |
| Image pickup apparatus A100 | CAM-1 | CAMCL-11 | L-1 | LCL-11 | 6000K | Sunlight | Daytime | April, 2021 | Osaka | Red | Car |
| Image pickup apparatus B200 | CAM-1 | CAMCL-11 | L-1 | LCL-11 | 6000K | Sunlight | Daytime | April, 2021 | Osaka | Red | Car |

FIG. 13B

| Standard image pickup apparatus | Image pickup conditions | | | | | | | | | |
|---|---|---|---|---|---|---|---|---|---|---|
| | Image pickup apparatus B200 | | Lens B20 | | Illumination environment color temarature of image pickup apparatus B200 | Light source type of image pickup apparatus B200 | Image pickup time zone of image pickup apparatus B200 | Image pickup month/year of image pickup apparatus B200 | Image pickup location of image pickup apparatus B200 | Important color of image pickup apparatus B200 | Pickup object type of image pickup apparatus B200 |
| | Model number | Serial number | Model number | Serial number | | | | | | | |
| Image pickup apparatus A100 | CAM-1 | CAMCL-12 | L-1 | LCL-12 | 6000K | LED | Daytime | April, 2021 | Tokyo | Flesh color | Person |
| Image pickup apparatus A100 | CAM-1 | CAMCL-12 | L-2 | LCL-21 | 6000K | LED | Daytime | April, 2021 | Tokyo | Flesh color | Person |
| Image pickup apparatus A100 | CAM-1 | CAMCL-12 | L-1 | LCL-12 | 3000K | Halogen lamp | Evening | April, 2021 | Tokyo | Flesh color | Person |
| Image pickup apparatus A100 | CAM-2 | CAMCL-21 | L-1 | LCL-12 | 6000K | Sunlight | Daytime | April, 2021 | Osaka | Red | Car |
| Image pickup apparatus B200 | CAM-1 | CAMCL-12 | L-1 | LCL-12 | 6000K | Sunlight | Daytime | April, 2021 | Osaka | Red | Car |

FIG. 14

| LUT1 | | | | | |
|---|---|---|---|---|---|
| Rin | Gin | Bin | Rout | Gout | Bout |
| 0 | 0 | 0 | 0 | 0 | 0 |
| 0 | 0 | 1 | 0 | 2 | 3 |
| ... | ... | ... | ... | ... | ... |
| 0 | 0 | 255 | 10 | 15 | 243 |
| 0 | 1 | 0 | 0 | 3 | 1 |
| 0 | 1 | 1 | 0 | 4 | 6 |
| ... | ... | ... | ... | ... | ... |
| 0 | 1 | 255 | 8 | 23 | 254 |
| 0 | 2 | 0 | 2 | 10 | 2 |
| 0 | 2 | 1 | 2 | 12 | 5 |
| ... | ... | ... | ... | ... | ... |
| 0 | 255 | 255 | 13 | 245 | 252 |
| 1 | 0 | 0 | 2 | 1 | 1 |
| 1 | 0 | 1 | 2 | 1 | 2 |
| ... | ... | ... | ... | ... | ... |
| 255 | 255 | 255 | 243 | 252 | 246 |

⎫
⎬ 1400
⎭

| LUT2 | | | | | |
|---|---|---|---|---|---|
| Rin | Gin | Bin | Rout | Gout | Bout |
| 0 | 0 | 0 | 0 | 0 | 0 |
| 0 | 0 | 1 | 0 | 2 | 4 |
| ... | ... | ... | ... | ... | ... |
| 0 | 0 | 255 | 10 | 17 | 243 |
| 0 | 1 | 0 | 0 | 3 | 2 |
| 0 | 1 | 1 | 0 | 4 | 7 |
| ... | ... | ... | ... | ... | ... |
| 0 | 1 | 255 | 8 | 23 | 253 |
| 0 | 2 | 0 | 1 | 10 | 2 |
| 0 | 2 | 1 | 1 | 12 | 5 |
| ... | ... | ... | ... | ... | ... |
| 0 | 255 | 255 | 13 | 245 | 253 |
| 1 | 0 | 0 | 3 | 1 | 1 |
| 1 | 0 | 1 | 3 | 1 | 3 |
| ... | ... | ... | ... | ... | ... |
| 255 | 255 | 255 | 243 | 252 | 244 |

| | | Image pickup conditions | | | | | | | | | | |
|---|---|---|---|---|---|---|---|---|---|---|---|---|
| | Standard image pickup apparatus | Image pickup apparatus A100 | | Lens A10 | | Illumination environment color temarature of image pickup apparatus A100 | Image pickup apparatus B200 | | Lens B20 | | Illumination environment color temperature of image pickup apparatus B100 | Usage of LUT |
| | | Model number | Serial number | Model number | Serial number | | Model number | Serial number | Model number | Serial number | | |
| LUT1 | Image pickup apparatus A100 | CAM-1 | CAMCL-11 | L-1 | LCL-11 | 6000K | CAM-1 | CAMCL-12 | L-1 | LCL-12 | 6000K | Interpolation |
| LUT2 | Image pickup apparatus A100 | CAM-1 | CAMCL-11 | L-1 | LCL-11 | 6000K | CAM-1 | CAMCL-12 | L-2 | LCL-21 | 6000K | Selection |
| LUT3 | Image pickup apparatus A100 | CAM-1 | CAMCL-11 | L-1 | LCL-11 | 3000K | CAM-1 | CAMCL-12 | L-1 | LCL-12 | 3000K | Interpolation |
| LUT4 | Image pickup apparatus A100 | CAM-1 | CAMCL-11 | L-1 | LCL-11 | 6000K | CAM-2 | CAMCL-21 | L-1 | LCL-12 | 6000K | Selection |
| LUT5 | Image pickup apparatus B200 | CAM-1 | CAMCL-11 | L-1 | LCL-11 | 6000K | CAM-1 | CAMCL-12 | L-1 | LCL-12 | 6000K | Selection |

CONTROL APPARATUS APPLIED TO IMAGE PICKUP SYSTEM, CONTROL METHOD THEREFOR, AND STORAGE MEDIUM STORING CONTROL PROGRAM THEREFOR

BACKGROUND OF THE INVENTION

Field of the Invention

The present invention relates to a control apparatus applied to an image pickup apparatus, a control method therefor, and a storage medium storing a control program therefor.

Description of the Related Art

Generally, a plurality of image pickup apparatuses are used to pick up images on a video production spot. Even if the same object is picked up, color and luminance of an object in pickup images obtained from image pickup apparatuses are different due to difference in image pickup conditions, such as model numbers and individual differences of the image pickup apparatuses and lenses to be used, and a color temperature of illumination environment.

Japanese Laid-Open Patent Publication (Kokai) No. 2020-47082 (JP 2020-47082A) discloses a technique of matching color and luminance between a plurality of image pickup apparatuses by picking up a standard object as a standard of color with the plurality of image pickup apparatuses to be used and by correcting color and luminance of a pickup image in each image pickup apparatus on the basis of the pickup image. Moreover, a color/luminance correction parameter for every image pickup condition can be generated beforehand. In such a case, a color/luminance correction parameter corresponding to an image pickup condition can be selected and set to each image pickup apparatus on a video production spot, which shortens a time period required to pick up an image.

However, since the above-mentioned conventional method needs to set a parameter manually when setting the generated color/luminance correction parameter to each image pickup apparatus or a pickup image, it is troublesome.

SUMMARY OF THE INVENTION

The present invention provides a control apparatus, a control method therefor, and a storage medium storing a control program therefor, which are capable of setting a suitable correction parameter while reducing user's troublesome.

Accordingly, an aspect of the present invention provides a control apparatus including a database configured to hold correction parameters for correcting pickup images so as to reduce color difference between pickup images of image pickup apparatuses in association with combinations of information showing a standard image pickup apparatus among the image pickup apparatuses and image pickup conditions of the image pickup apparatuses, a memory device that stores a set of instructions, and at least one processor that executes the set of instructions to obtain first information showing a standard image pickup apparatus at a present time among the image pickup apparatuses and second information showing a target image pickup apparatus that picks up a pickup image as a correction target at the present time, obtain the image pickup conditions of the image pickup apparatuses, determine a setting correction parameter that is set to the target image pickup apparatus shown by the second information from the database based on the first information obtained and the image pickup conditions of the image pickup apparatuses obtained, and output the setting correction parameter determined.

According to the present invention, a suitable correction parameter can be set up while reducing user's troublesome.

Further features of the present invention will become apparent from the following description of exemplary embodiments with reference to the attached drawings.

BRIEF DESCRIPTION OF THE DRAWINGS

FIG. 3 is a view showing an example of a 3D-LUT (three-dimensional look-up table).

FIG. 4 is a view showing an example of a database.

FIG. 7 is a view showing an example of a GUI for selecting a standard image pickup apparatus and a target image pickup apparatus.

FIG. 10 is a view showing an example of an LUT database.

FIG. 12 is a view showing an example of a selection screen for selecting a standard image pickup apparatus and a target image pickup apparatus.

FIG. 13A and FIG. 13B are tables showing correlations between image pickup conditions and correction parameters.

FIG. 14 is a view showing an example of correction database coupling.

FIG. 15 is a view showing an example of the database for selecting usage of an LUT.

DESCRIPTION OF THE EMBODIMENTS

Figure 1:
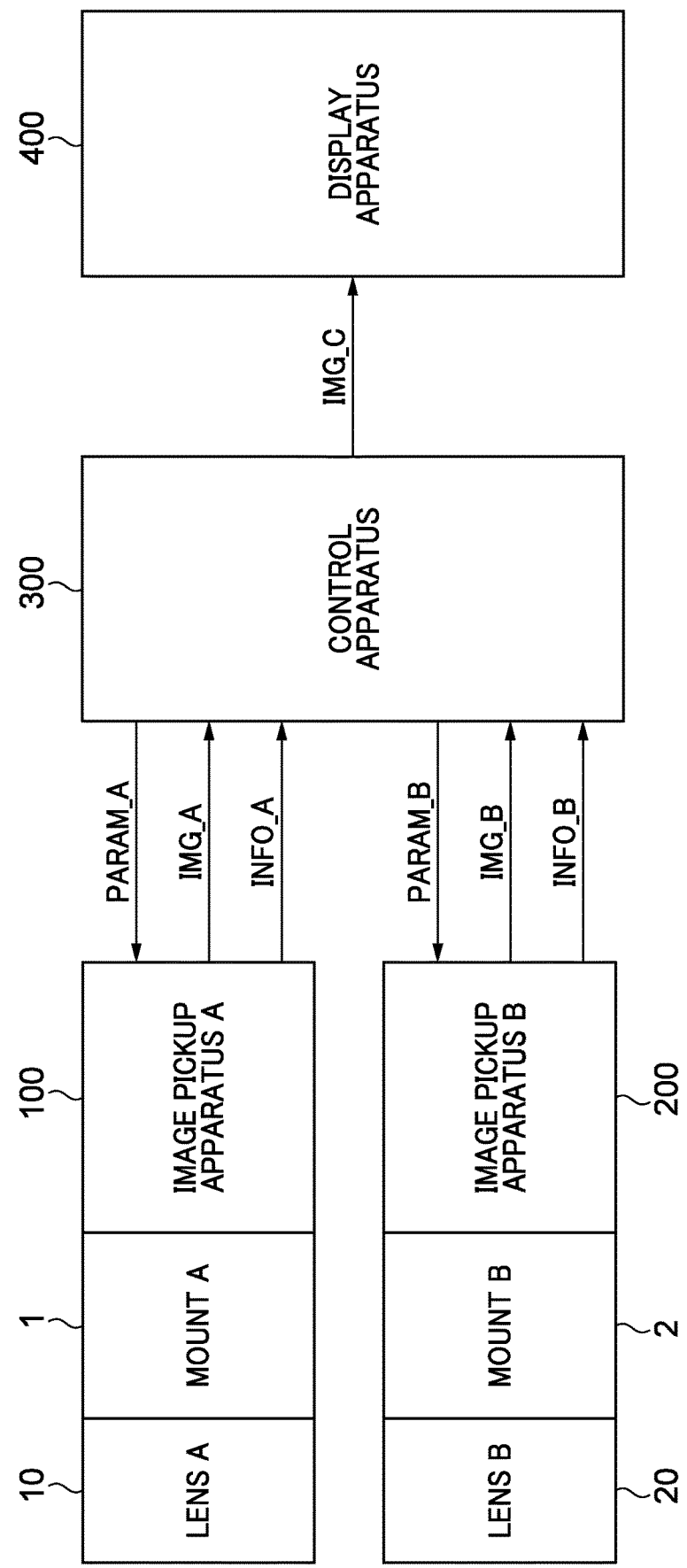
FIG. 1 is a block diagram schematically showing an entire configuration of an image processing system to which a control apparatus according to a first embodiment of the present invention is applied.

Hereafter, embodiments according to the present invention will be described in detail by referring to the drawings.

FIG. 1 is a block diagram schematically showing an entire configuration of an image processing system to which a control apparatus according to a first embodiment of the present invention is applied.

This image pickup system has an image pickup apparatus A 100, an image pickup apparatus B 200, the control apparatus 300, and a display apparatus 400. A lens A 10 is detachably attached to the image pickup apparatus A 100 through a mount A 1. The lens B 20 is detachably attached to the image pickup apparatus B 200 through a mount B 2.

The image pickup apparatus A 100 outputs a pickup image IMG_A to the control apparatus 300. The image pickup apparatus A 100 is controlled on the basis of parameters PARAM_A received from the control apparatus 300. In order to match color and luminance between the image pickup apparatus A 100 and the image pickup apparatus B 200, a color/luminance correction parameter is set to an image processor 103 (FIG. 2) in the image pickup apparatus A 100. The color/luminance correction parameter is also one of parameters belonging to the parameters PARAM_A.

Moreover, the image pickup apparatus A 100 outputs image pickup apparatus information INFO_A to the control apparatus 300. The image pickup apparatus information INFO_A includes image pickup apparatus information and illumination light information. The image pickup apparatus information includes information relevant to the image pickup apparatus A 100. Specifically, a model number and serial number of the image pickup apparatus A 100, and a model number of the lens A 10 that is attached to the image pickup apparatus A 100 are included.

The mount A 1 is provided with electric contacts for supplying electric power to the lens A 10 from the image pickup apparatus A 100 and for enabling mutual communication between the image pickup apparatus A 100 and the lens A 10. Although the mount A 1 is divided into a part provided in the image pickup apparatus A 100 and a part provided in the lens A 10, they are shown by a single component in FIG. 1 for convenience.

Light entering through the lens A 10 is received by an image sensor 101 (FIG. 2) in the image pickup apparatus A 100. A pickup image IMG_A is generated by applying an A/D conversion and an image process to an output signal from the image sensor 101. The image pickup apparatus A 100 controls zooming and focusing of the lens A 10.

The image pickup apparatus B 200 outputs a pickup image IMG_B to the control apparatus 300. The image pickup apparatus B 200 is controlled on the basis of parameters PARAM_B received from the control apparatus 300. In order to match color and luminance between the image pickup apparatus B 200 and the image pickup apparatus A 100, a color/luminance correction parameter is set to an image processor 203 (FIG. 2) in the image pickup apparatus B 200. The color/luminance correction parameter is also one of parameters belonging to the parameters PARAM_B.

Moreover, the image pickup apparatus B 200 outputs image pickup apparatus information INFO_B to the control apparatus 300. The image pickup apparatus information INFO_B includes image pickup apparatus information and illumination light information. The image pickup apparatus information includes information relevant to the image pickup apparatus B 200. Specifically, a model number and serial number of the image pickup apparatus B 200, and a model number of the lens B 20 that is attached to the image pickup apparatus B 200 are included.

The mount B 1 is provided with electric contacts for supplying electric power to the lens B 20 from the image pickup apparatus B 200 and for enabling mutual communication between the image pickup apparatus B 200 and the lens B 20. Although the mount B 1 is divided into a part provided in the image pickup apparatus B 200 and a part provided in the lens B 20, they are shown by a single component in FIG. 1 for convenience.

Light entering through the lens B 20 is received by an image sensor 201 (FIG. 2) in the image pickup apparatus B 200. A pickup image IMG_B is generated by applying an A/D conversion and an image process to an output signal from the image sensor 201. The image pickup apparatus B 200 controls zooming and focusing of the lens B 20.

The control apparatus 300 outputs images generated from the pickup image IMG_A and pickup image IMG_B received, a user menu, etc. to the display apparatus 400 as images IMG_C. Moreover, the control apparatus 300 outputs the parameters PARAM_A and PARAM_B including the color/luminance correction parameters to the respective image pickup apparatuses on the basis of the image pickup apparatus information INFO_A from the image pickup apparatus A 100 and the image pickup apparatus information INFO_B from the image pickup apparatus B 200. Thereafter, a color/luminance correction parameter may be written as a "correction parameter".

The display apparatus 400 displays the images IMG_C received from the control apparatus 300. A user who uses the image pickup system can check the pickup images of the respective image pickup apparatuses with the display apparatus 400.

In the embodiment, the image pickup system that performs color/luminance matching between two image pickup apparatuses (the image pickup apparatus A 100 and the image pickup apparatus B 200) is described as an example. However, the number of image pickup apparatuses may be three or more. Although the lens interchangeable image pickup apparatuses A 100 and B 200 are exemplified as image pickup apparatuses, an image pickup apparatus with a built-in lens may be used.

Figure 2:
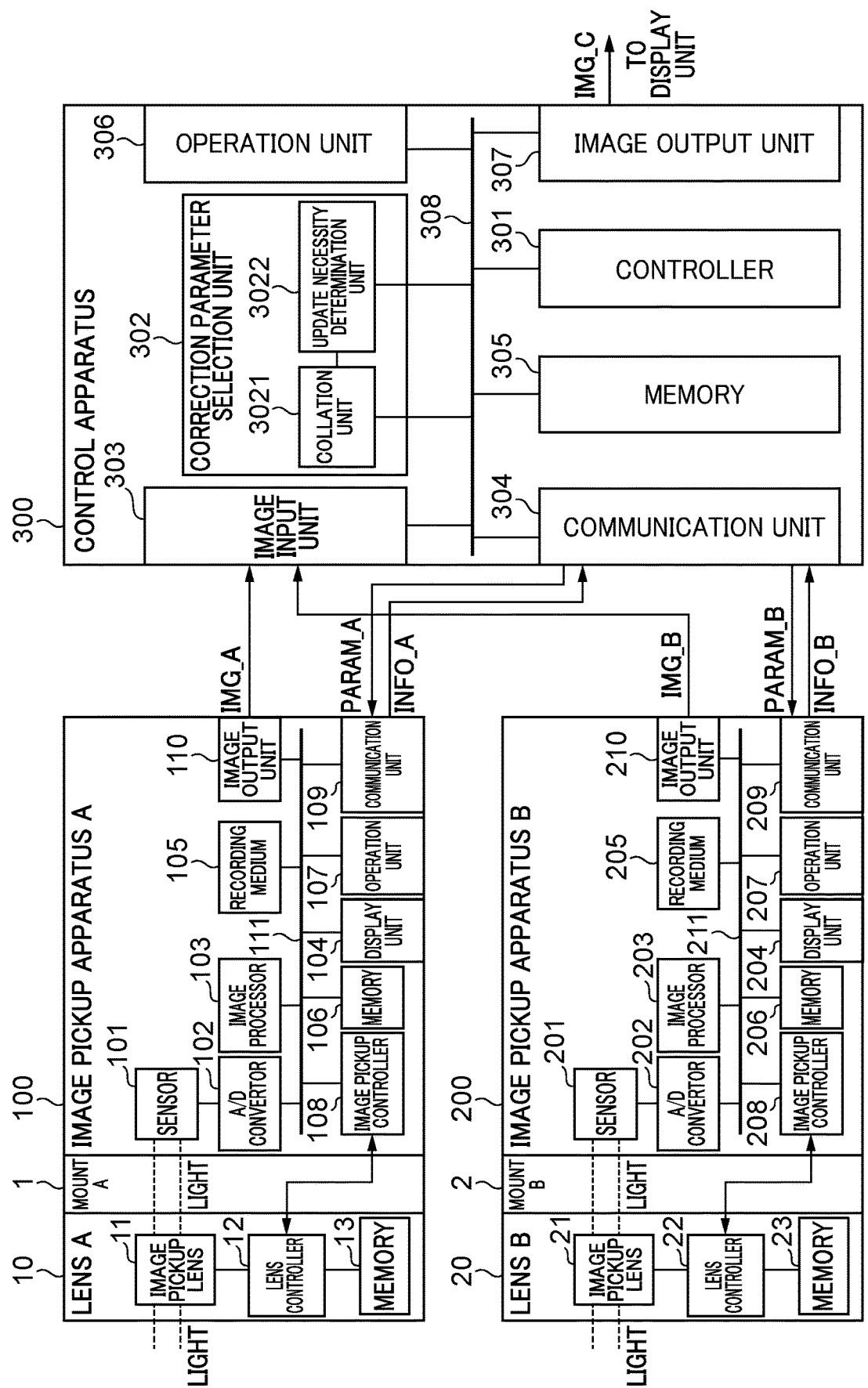
FIG. 2 is a block diagram showing a functional configuration example of the image pickup system in detail.

FIG. 2 is a block diagram showing a functional configuration example of the image pickup system in detail. An operation of each block is described using FIG. 2.

The lens A 10 has an image pickup lens 11, a lens controller 12, and a memory 13. The image pickup lens 11 is provided with actuators and motors that move and operate a focusing lens, a zoom lens, a diaphragm, an image stabilization lens, etc. that are included in the image pickup lens 11 according to control by the lens controller 12.

The lens controller 12 has a microcomputer (not shown) and controls the image pickup lens 11 according to a control signal received through the mount A 1 from an image pickup controller 108. The memory 13 is used as a storage device storing various data used by the lens controller 12.

The image sensor 101 of the image pickup apparatus A 100 is connected to an A/D converter 102. In the image pickup apparatus A 100, the A/D converter 102, the image processor 103, a display unit 104, a recording medium 105, a memory 106, an operation unit 107, the image pickup controller 108, a communication unit 109, and an image output unit 110 are connected to a bus 111.

The lens B 20 has an image pickup lens 21, a lens controller 22, and a memory 23. In the image pickup apparatus B 200, an A/D converter 202, the image processor 203, a display unit 204, a recording medium 205, a memory 206, an operation unit 207, an image pickup controller 208, a communication unit 209, and an image output unit 210 are connected to a bus 211. The lens B 20 is configured as with the lens A 10. The image pickup apparatus B 200 is configured as with the image pickup apparatus A 100. Accordingly, the image pickup apparatus A 100 and the lens A 10 are described in detail as representatives, and the detailed descriptions of the components in the image pickup apparatus B 200 and the lens B 20 are omitted.

In the image pickup apparatus A 100, the image sensor 101 is a photoelectric conversion device that has a plurality of pixels. The image sensor 101 photoelectrically converts an object image formed by the image pickup lens 11 in the lens A 10 and outputs an analog electric signal corresponding to the object image.

The A/D converter 102 converts the analog electric signal output from the image sensor 101 into a digital signal. The image processor 103 generates the pickup image IMG_A by applying various kinds of image processes to the digital signal output from the A/D converter 102. The image processor 103 performs what is called a development process including an optical correction process that corrects influence due to an optical property of the image pickup lens 11 on an image by an image process, a pixel interpolation process, a luminance correction process, and a color correction process.

The image data generated by the image processor 103 is displayed on the display unit 104 or is recorded in the recording medium 105, such as a memory card. Moreover, the generated image data is output to an image input unit 303 of the control apparatus 300 as the pickup image IMG_A from the image output unit 110. This image processor 103 applies a correction parameter between a plurality of image pickup apparatuses to a pickup image.

Moreover, the image processor 103 has a function to estimate a color temperature of illumination environment on the basis of the pickup image. The memory 106 functions as a process buffer of the image processor 103 and stores a program executed by the image pickup controller 108. Moreover, the memory 106 stores optical correction data in which an optical correction value used by the image processor 103 is defined and GUI data of a menu screen etc. displayed on the display unit 104 of the image pickup apparatus A 100.

The operation unit 107 is an input device group through which a user inputs an instruction to the image pickup apparatus A 100. The operation unit 107 includes a power switch for turning ON/OFF of a power source, an image pickup switch for starting recording of an image, a selection/set switch for setting various menus, etc.

The image pickup controller 108 has a microcomputer (not shown) and runs the program stored in the memory 106 so as to control operations of the entire image pickup apparatus A 100 and the entire lens A 10, such as the control of the image processor 103 and the control of the communication between the image pickup apparatus A 100 and the lens A 10.

The communication unit 109 has a function to communicate with another device through a LAN or a USB and communicates with a communication unit 304 of the control apparatus 300. The communication unit 109 transmits the image pickup apparatus information INFO_A to the control apparatus 300 and receives the parameters PARAM_A including a color/luminance correction parameter from the control apparatus 300.

The image output unit 110 has a function to transmit the pickup image IMG_A to another device through the LAN or an HDMI and outputs the pickup image IMG_A to the image input unit 303 of the control apparatus 300. The A/D converter 102, image processor 103, display unit 104, recording medium 105, memory 106, operation unit 107, image pickup controller 108, communication unit 109, and image output unit 110 exchange signals through the bus 111.

The control apparatus 300 has a controller 301, a color/luminance correction parameter selection unit 302, the image input unit 303, the communication unit 304, a memory 305, an operation unit 306, and an image output unit 307. The controller 301 has a microcomputer (not shown) and runs the program stored in the memory 305 so as to control operations of the entire control apparatus, such as the control of the color/luminance correction parameter selection unit 302 and the control of communication with each image pickup apparatus.

The color/luminance correction parameter selection unit 302 has a collation unit 3021 and an update necessity determination unit 3022. The collation unit 3021 determines the color/luminance correction parameter that is set to each image pickup apparatus on the basis of the image pickup apparatus information INFO_A and INFO_B, "standard image pickup apparatus information" that shows an image pickup apparatus used as a standard of the color/luminance matching between a plurality of image pickup apparatuses. In determining the color/luminance correction parameter, the collation unit 3021 uses a database that is mentioned later by referring to FIG. 4. This database is a table defining a correlation between an image pickup condition of each image pickup apparatus and a color/luminance correction parameter (a correction parameter LUT (Look Up Table)) that is set to a pickup image of each image pickup apparatus in order to reduce color difference and luminance difference between a plurality of image pickup apparatuses on that image pickup condition.

Next, a method of applying the color/luminance correction parameter to a pickup image is described. Hereinafter, color/luminance correction using a 3D-LUT is described as an example.

FIG. 3 is a view showing an example of the 3D-LUT. An image before color/luminance correction shall have 8 bit gradations for each of R, G, and B. The 3D-LUT associates an RGB output value to a specific RGB input value one-to-one. Rin, Gin, and Bin shown in FIG. 3 respectively indicate gradation values of R, G, and B before the color/luminance correction. Rout, Gout, and Bout respectively indicate gradation values of R, G, and B after the color/luminance correction.

Since the 3D-LUT is a table that defines 256 input gradations (0 through 255) for each of R, G, and B by a step, the table includes about 16.77 million combinations (R256*G256*B256). For example, when an input RGB value of a certain pixel in an image before the color/luminance correction is (Rin, Gin, Bin)=(0, 255, 255), an output RGB value becomes (Rout, Gout, Bout)=(13, 245, 252) according to the 3D-LUT in FIG. 3. The image processor 103 is able to obtain an image of which color and luminance are corrected by applying the 3D-LUT to an RGB value of each pixel that constitutes the image before the color/luminance correction.

The 3D-LUT shown in FIG. 3 defines 256 gradations for each of R, G, and B by a step. However, a 3D-LUT that defines 16 steps for each of R, G, and B and consists of 4096 combinations (R16*G16*B16) may be employed in order to save LUT size. At that time, an input gradation other than the combinations of the RGB values defined by the 3D-LUT is also convertible by using well-known triangular pyramid interpolation etc. Although the 3D-LUT is described as an example of the color/luminance correction method in the embodiment, the method is not limited to this. For example, a 1D-LUT or a color matrix as a well-known technique may be employed. A combination of some methods may be employed.

FIG. 4 is a view showing an example of the database. The database is stored and held in the memory 305 as a holding means and is referred by the collation unit 3021. The database associates correction parameter LUTs with combinations of standard image pickup apparatus information and image pickup conditions of a plurality of image pickup apparatuses. The correction parameter LUT is the information for correcting a pickup image so as to reduce color difference between pickup images of the image pickup apparatuses. To reduce color difference between pickup images of the image pickup apparatuses means to reduce difference in colors of the same object in images picked up by the image pickup apparatuses in the same image pickup conditions, for example.

The database includes standard image pickup apparatus information and image pickup conditions. A standard image pickup apparatus, which becomes a standard of a color/luminance matching, is one of the image pickup apparatuses. Information that shows the standard image pickup apparatus is standard image pickup apparatus information. In the embodiment, the image pickup apparatus A 100 or the image pickup apparatus B 200 becomes the standard image pickup apparatus for every correction parameter LUT. LUT1 through LUT5 are registered as the correction parameter LUTs. The image pickup conditions include information about a body of each image pickup apparatus, information about a lens attached to each image pickup apparatus, and information about illumination environment color temperature of each image pickup apparatus. In addition to these, information showing presence of an ND filter may be included in the image pickup conditions.

The information about a body includes a model number and serial number of each image pickup apparatus, for example, and the information about a lens includes a model number and serial number of each lens. For example, the image pickup apparatus A 100 is associated with the standard image pickup apparatus information in the LUT1. Moreover, the model number CAM-1 and serial number CAMCL-11 of the image pickup apparatus A 100, the model number L-1 and serial number LCL-11 of the lens A 10, and the illumination environmental color temperature 6000K of the image pickup apparatus A 100 are associated as the image pickup conditions with the LUT1. Moreover, the model number CAM-1 and serial number CAMCL-12 of the image pickup apparatus B 200, the model number L-1 and serial number LCL-12 of the lens B 20, and the illumination environmental color temperature 6000K of the image pickup apparatus B 200 are associated as the image pickup conditions with the LUT1.

Figure 5:
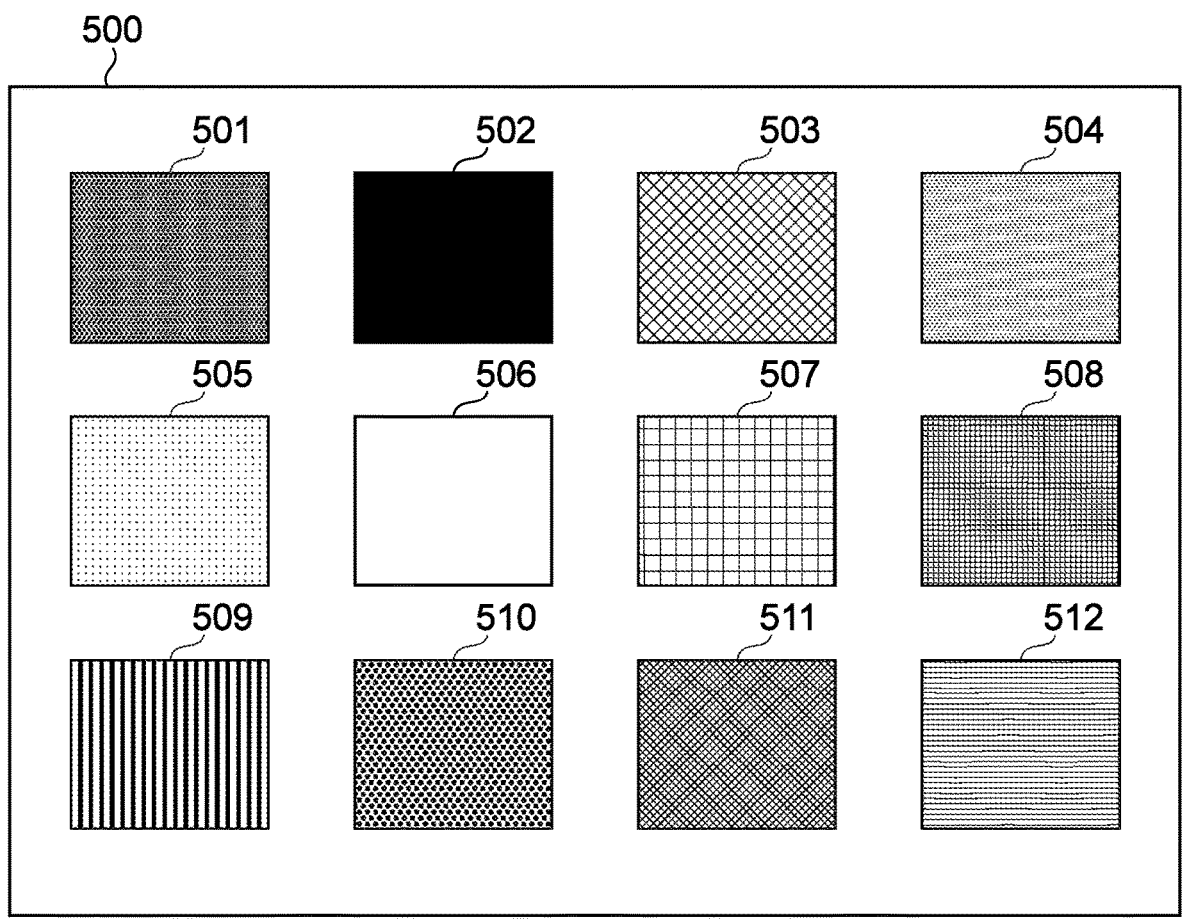
FIG. 5 is a view showing an example of a color chart.

The correction parameter LUTs shown in FIG. 4 can be generated by a general method using a color chart. FIG. 5 is a view showing an example of a color chart 500.

Patches 501 through 512 that are measurement images of which colors are different are arranged on the color chart 500. The difference of patterns of the patches 501 through 512 shown in FIG. 5 represents difference of the colors. The controller 301 generates a correction parameter LUT on the basis of a plurality of color chart pickup images that are obtained by picking up the color chart 500 by the respective image pickup apparatuses and the standard image pickup apparatus information. For example, when the standard image pickup apparatus is the image pickup apparatus A 100, color/luminance correction parameter is set to an image pickup apparatus (non-standard image pickup apparatus) other than the standard image pickup apparatus. That is, the parameter is set to the image pickup apparatus B 200 in this embodiment. The correction parameter LUT is generated so that the color and luminance of the patches 501 through 512 in the color chart pickup image picked by the image pickup apparatus B 200 will become near to the color and luminance of the patches 501 through 512 in the color chart pickup image picked up by the image pickup apparatus A 100.

Although the two image pickup apparatuses are used in the embodiment, three or more image pickup apparatuses may be used. When the number of the image pickup apparatuses is N, the number of non-standard image pickup apparatus(es) becomes (N−1), and the color/luminance correction parameter LUT(s) of the number (N−1) is (are) generated under the same image pickup conditions.

The shape of the color chart 500 and the number of the patches are not limited to the example shown in FIG. 5. The more the number of the patches is, the more accurate the obtained color information about each image pickup apparatus is. It is necessary to generate a color/luminance correction parameter LUT for every image pickup condition shown in FIG. 4 and for every standard image pickup apparatus. For example, as compared to the LUT1, the lens B 20 attached to the image pickup apparatus B 200 is different in the LUT2, the illumination environment color temperature is different in the LUT3, the image pickup apparatus B 200 is different in the LUT4, and the standard image pickup apparatus information is different in the LUT5. The correction parameter LUT1 through the correction parameter LUT5 generated under the respective image pickup conditions are held in the memory 305. Although a correction parameter LUT is generated by the controller 301 in the control apparatus 300, it may be generated by an independent processing block (not shown) like the color/luminance correction parameter selection unit 302 The color/luminance correction parameter LUT1 through the color/luminance correction parameter LUT5 generated under the above image pickup conditions are managed as the database while associating with the standard image pickup apparatus information and the image pickup conditions of the respective image pickup apparatuses.

The collation unit 3021 shown in FIG. 2 collates the obtained image pickup conditions of each image pickup apparatuses and the standard image pickup apparatus information with the above-mentioned database and determines a correction parameter LUT that is transmitted to each image pickup apparatus. The update necessity determination unit 3022 determines necessity of update of the correction parameter LUT that is currently applied to the pickup image of each image pickup apparatus by comparing the correction parameter LUT obtained by the collation unit 3021 with the correction parameter LUT applied currently. It should be noted that the controller 301 may determine the correction parameter LUT and compare both the correction parameter LUTs. As a result of the comparison, when the both agree, it is determined that the update is unnecessary because the update is not required. In the meantime, when the both disagree, it is determined that the update is necessary because the update is required. At that time, the agreement between both the correction parameter LUTs is not necessarily perfect agreement. For example, when difference between correction parameters of both the correction parameter LUTs falls within a permissible threshold range (a predetermined permissible range), it may be determined that both the correction parameter LUTs agree. And when the difference exceeds the permissible threshold range, it may be determined that the both disagree.

The image input unit 303 has image input interfaces, such as a LAN and HDMI. The image input unit 303 obtains the pickup image IMG_A from the image output unit 110 of the image pickup apparatus A 100 and obtains the pickup image IMG_B from the image output unit 210 of the image pickup apparatus B 200.

The communication unit 304 has a function to communicate with another device through a LAN or a USB and communicates with the communication unit 109 of the image pickup apparatus A 100 or the communication unit 209 of the image pickup apparatus B 200. For example, when the standard image pickup apparatus about the color/luminance correction is the image pickup apparatus A 100, the color/luminance correction parameter LUT determined by the collation unit 3021 is transmitted as the PARAM_B to the image pickup apparatus B 200.

The memory 305 functions as various process buffers and stores programs executed by the controller 301 and the database of the color/luminance correction parameters as shown in FIG. 4. Moreover, the memory 305 stores GUI data of the menu screen etc. that are displayed on the display unit 400 by the control apparatus 300 through the image output unit 307.

The operation unit 306 is an input device group through which a user inputs an instruction to the controller 301. The operation unit 306 includes a power switch for turning ON/OFF of a power source and a switch for starting to apply and update the color/luminance correction parameters to each image pickup apparatus. The image output unit 307 has a function to transmit the images IMG_C to another device through an SDI, HDMI, etc. For example, the image output unit 307 transmits the images IMG_C to the display apparatus 400 etc.

Next, a process that automatically selects a color/luminance correction parameter on the basis of the standard image pickup apparatus information and the image pickup conditions of each image pickup apparatus and that outputs the selected parameters if needed will be described. Hereinafter, an image pickup apparatus used as a correction target of a pickup image is called a "target image pickup apparatus". A color/luminance correction parameter determined as what is transmitted to a target image pickup apparatus among a plurality of color/luminance correction parameters is called a "setting correction parameter".

Figure 6:
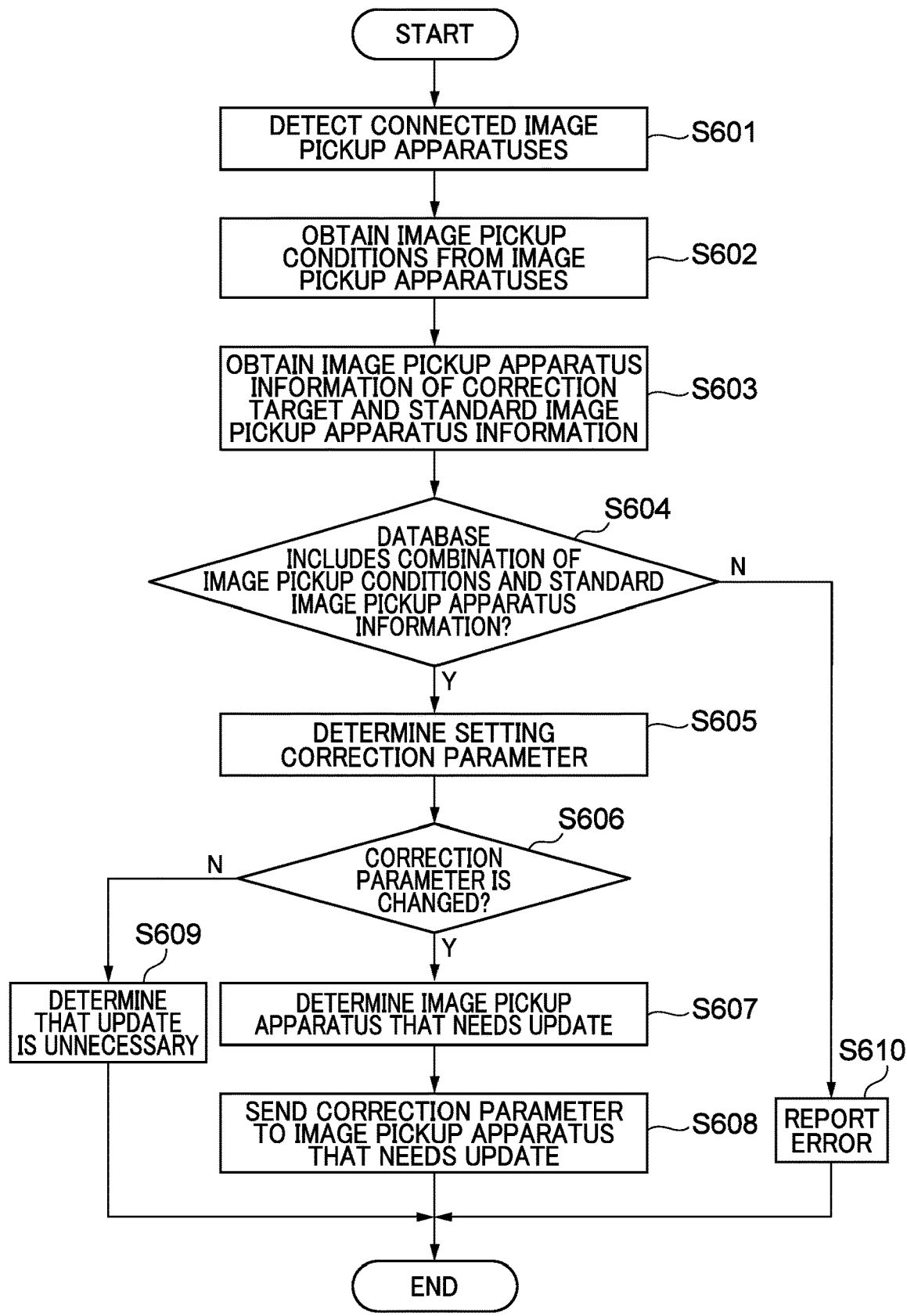
FIG. 6 is a flowchart showing a correction parameter output process.

FIG. 6 is a flowchart showing a correction parameter output process. This process is achieved when a CPU provided in the controller 301 develops the program stored in the memory 305 to a RAM provided in the controller 301 and runs it. This process is started when a user inputs an instruction to set or update a color/luminance correction parameter through the operation unit 306. In this process, the controller 301 plays roles of a first obtainment means, a second obtainment means, a determination means, and a control means.

In a step S601, the controller 301 detects image pickup apparatuses connected to the control apparatus 300. In the embodiment, the image pickup apparatus A 100 and the image pickup apparatus B 200 are connected through the communication units 304, 109, and 209. The connection means either of the wired connection by USB, LAN, etc. and the wireless connection like Wi-Fi. When the mutual apparatuses can exchange information by communication, it is determined that the apparatuses are mutually connected. In the embodiment, the image pickup apparatus A 100 and the image pickup apparatus B 200 are detected as the connected image pickup apparatuses. The information showing the detected image pickup apparatuses is stored in the memory 305.

In a step S602, the controller 301 obtains the image pickup conditions from each image pickup apparatus connected to the communication unit 304. Although a procedure to obtain the image pickup conditions from the image pickup apparatus A 100 is shown hereinafter, a procedure to obtain the image pickup conditions from the image pickup apparatus B 200 is also identical.

According to an instruction from the controller 301, the communication unit 304 transmits an instruction to the communication unit 109 of the image pickup apparatus A 100 on the basis of the detection result in the step S601 so as to output the image pickup apparatus information INFO_A including the image pickup conditions. In the image pickup apparatus A 100 that receives the instruction, the image pickup controller 108 obtains the model number and serial number of the image pickup apparatus A 100 from the memory 106. Moreover, the image pickup controller 108 gives an instruction to the lens controller 12 and obtains the model number and serial number of the lens A 10 from the memory 13 of the lens A 10. Furthermore, the image pickup controller 108 obtains the illumination environment color temperature of the image pickup apparatus A 100 from the image processor 103. The image pickup controller 108 transmits the image pickup apparatus information INFO_A, which includes the obtained model number and serial number of the image pickup apparatus A 100, the model number and serial number of the lens A 10, and the illumination environment color temperature, to the control apparatus 300 from the communication unit 109.

Similarly, the controller 301 obtains the image pickup apparatus information INFO_B including the image pickup conditions of the image pickup apparatus B 200. The control apparatus 300 can obtain the image pickup conditions of each image pickup apparatus by the above-mentioned procedure. The obtained image pickup conditions of each image pickup apparatus are stored in the memory 305 of the control apparatus 300.

In a step S603, the controller 301 obtains the standard image pickup apparatus information (first information) about the standard image pickup apparatus at a present time and the target image pickup apparatus information (second information) about the target image pickup apparatus that picks up the pickup image as the correction target at the present time. The standard image pickup apparatus and the target image pickup apparatus are selected from among the image pickup apparatuses detected in the step S601.

FIG. 7 is a view showing an example of a GUI for selecting a standard image pickup apparatus and a target image pickup apparatus. First, the controller 301 calls the information for the GUI that prompts a user to select an image pickup apparatus from the memory 305. The image output unit 307 outputs the information as the images IMG_C to the display apparatus 400. Thereby, the GUI shown in FIG. 7 is displayed. In the example in FIG. 7, the image pickup apparatuses connected to the control apparatus 300 are displayed as a list. The image pickup apparatus A 100 (the serial number is CAMCL-11) is displayed on a first line of the list, and the image pickup apparatus B 200 (the serial number is CAMCL-12) is displayed on a second line of the list.

Although the model number and serial number of each image pickup apparatus are displayed in FIG. 7, the information about the lens or the illumination environment information may be displayed together. When the number of the image pickup apparatuses connected to the control apparatus 300 is N, a table of which the number of lines is N will be displayed as a list.

A user checks check boxes of the image pickup apparatuses (the target image pickup apparatuses) of the color/luminance correction target and a check box of the image pickup apparatus (the standard image pickup apparatus) of a color/luminance standard on the GUI in FIG. 7 by using the operation unit 306. In the example in FIG. 7, the check boxes of two image pickup apparatuses are checked about the target image pickup apparatus, and the check box of one standard image pickup apparatus is checked about the standard image pickup apparatus. A white quadrangle shows an unchecked state.

FIG. 7 shows a state where the user selects the image pickup apparatus A 100 on the first line as the target image pickup apparatus and the standard image pickup apparatus, and selects the image pickup apparatus B 200 on the second line as the target image pickup apparatus. The user informs the control apparatus 300 about completion of the selection by pressing a "next" button at the lower right in the GUI when the selection of image pickup apparatuses is completed. In this way, the controller 301 can obtain the target image pickup apparatus information and the standard image pickup apparatus information by prompting the user to designate a standard image pickup apparatus and a target image pickup apparatus on the screen on which the information showing a plurality of image pickup apparatuses is displayed. These pieces of obtained information are stored in the memory 305 of the control apparatus 300.

In a step S604, the controller 301 determines whether the database shown in FIG. 4 includes the combination of the image pickup conditions obtained in the step S602 and the standard image pickup apparatus information obtained in the step S603. The example of this process is described.

Since there are two image pickup apparatuses in the embodiment, the database about the two image pickup apparatuses as shown in FIG. 4 is used. When three or more image pickup apparatuses are used, it is necessary to generate a database corresponding to the number of apparatuses.

In the step S602, the following image pickup conditions shall be obtained. First, the model number and serial number of the image pickup apparatus A 100 shall be CAM-1 and CAMCL-11. The model number and serial number of the lens A 10 shall be L-1 and LCL-11. Moreover, the model number and serial number of the image pickup apparatus B 200 shall be CAM-1 and CAMCL-12. The model number and serial number of the lens B 20 shall be L-1 and LCL-12. Furthermore, the illumination environment color temperature of the image pickup apparatus A 100 and the image pickup apparatus B 200 shall be 6000K.

When the standard image pickup apparatus information obtained in the step S603 shows the image pickup apparatus A 100 and when the collation unit 3021 collates what satisfies the image pickup conditions obtained in the step S602 with the database, the correction parameter LUT1 is output as a collation result. Accordingly, the correction parameter LUT1 is specified as a correction parameter LUT that agrees with the above-mentioned combination. At this time, the collation unit 3021 stores the collation result of "agreement" in the memory 305 and replies the collation result concerned to the controller 301. The controller 301 determines that the above-mentioned combination is included in the database on the basis of the signal of "agreement" and executes a process from a step S605.

In the step S605, the controller 301 determines the setting correction parameter. That is, the controller 301 determines the correction parameter LUT that agrees with the above-mentioned combination and that is specified by the collation unit 3021 from the database as the setting correction parameter.

In the meantime, when the database does not include a correction parameter LUT that agrees with the combination of the image pickup condition and the standard image pickup apparatus information that are obtained in the steps S602 and S603, the collation unit 3021 replies the collation result of "disagreement" to the controller 301. The controller 301 determines that the database does not include the above-mentioned combination on the basis of the signal of "disagreement" and executes a process in a step S610.

The controller 301 reports an error in the step S610, and finishes the process shown in FIG. 6. For example, the controller 301 accesses the memory 305, calls an error report image etc., and outputs this to the display apparatus 400 through the image output unit 307. At that time, the controller 301 may inform the user to prompt generation of the correction parameter corresponding to the above-mentioned combination by displaying a message on the display apparatus 400.

In a step S606, the controller 301 compares the correction parameter LUT_N−1 set to each target image pickup apparatus at the previous time to the correction parameter LUT_N (setting correction parameter) determined at the present time. Then, the controller 301 determines whether there is a change in the correction parameter (i.e., whether the above-mentioned both disagree). When the standard image pickup apparatus is the image pickup apparatus A 100, the parameters PARAM_B correspond to the correction parameter LUT_N determined at the present time.

When determining that the both agree as a result of the comparison of the both, the update necessity determination unit 3022 transmits a signal, which indicates that the correction parameter of the target image pickup apparatus is not updated, to the controller 301. Then, the controller 301 determines that there is no change in the correction parameter and proceeds with the process to a step S609. In the meantime, when determining that the both disagree, the update necessity determination unit 3022 transmits a signal, which indicates that the correction parameter of the target image pickup apparatus is updated, to the controller 301. Then, the controller 301 determines that there is a change to the correction parameter and proceeds with the process to a step S607.

As mentioned above, the update necessity determination unit 3022 may determine that the both agree when the difference between the both falls within the permissible threshold range (predetermined permissible range) and may determine that the both disagree when the difference exceeds the permissible threshold range.

When there is no correction parameter LUT set to each target image pickup apparatus at the previous time in the memory 305 (when the process in FIG. 6 is executed at a first time, for example), the update necessity determination unit 3022 may execute the process as with the case where the both disagree.

In the step S607, the controller 301 determines that the target image pickup apparatus of which both the correction parameters disagree needs the update of the correction parameter. When there are two or more target image pickup apparatuses, the update necessity of the correction parameter is determined for every target image pickup apparatus. In this case, since only a target image pickup apparatus of which the correction parameters disagree is determined as an image pickup apparatus that needs the update of the correction parameter, parameter update load can be reduced.

Alternatively, when there is at least one target image pickup apparatus of which both the correction parameter set at the previous time and the correction parameter determined at the present time disagree, it may be determined that all the target image pickup apparatuses need to update.

It should be noted that the update necessity determination method is not limited to the above-mentioned method. For example, when the image pickup conditions of the standard image pickup apparatus stored in the memory 305 disagree with the image pickup conditions of the standard image pickup apparatus corresponding to the correction parameter determined at the present time, the controller 301 may determine that all the target image pickup apparatuses need the update. Alternatively, when the image pickup conditions of the target image pickup apparatus disagree with the image pickup conditions of the target image pickup apparatus corresponding to the correction parameter determined at the present time, the target image pickup apparatus of which the image pickup conditions disagree may be determined as an image pickup apparatus that needs the update.

In a step S608, the controller 301 sends (outputs) the setting correction parameter to the target image pickup apparatus that is determined to need the update of the correction parameter through the communication unit 304. And then, the controller 301 finishes the process shown in FIG. 6. In this way, the controller 301 sends the setting correction parameter to the target image pickup apparatus that is determined to need the update and does not send the setting correction parameter to the target image pickup apparatus that is not determined to need the update. In other words, the controller 301 outputs the setting correction parameter on condition that the update of the correction parameter is determined to be necessary.

For example, when only the correction parameter of the image pickup apparatus B 200 is updated, the communication unit 304 of the control apparatus 300 transmits the parameters PARAM_B to the communication unit 209 of the image pickup apparatus B 200. When receiving the parameters PARAM_B, the image pickup apparatus B 200 performs the process for applying the correction parameter received to the image with the image processor 203 before the color/luminance correction. This process enables to automatically set the color/luminance correction parameter corresponding to the image pickup conditions etc. to each image pickup apparatus.

In a step S609, the controller 301 determines that there is no image pickup apparatus that needs the update of the correction parameter. And then, the controller 301 finishes the process shown in FIG. 6.

According to the process shown in FIG. 6, the color/luminance correction parameter set to the target image pickup apparatus is automatically selected on the basis of the image pickup condition and the standard image pickup apparatus information. This prevents selection mistake of the parameter that may be caused by a manual selection.

It should be noted that the determination result of the update necessity may be reported to a user by displaying a report screen. For example, the controller 301 may report the image pickup apparatus that needs the update of the correction parameter in the step S607. Moreover, the controller 301 may report that there is no image pickup apparatus that needs the update of the correction parameter in the step S609. Even when there are a plurality of image pickup apparatuses, the user can check an updating result of the correction parameter efficiently by showing the determination result to the user.

According to the embodiment, the table that associates a correction parameter LUT with every combination of the standard image pickup apparatus information and image pickup conditions of each image pickup apparatus is held as the database in the memory 305 (FIG. 4). The standard image pickup apparatus information (first information) and the target image pickup apparatus information (second information) are obtained, and the image pickup conditions of each image pickup apparatus are obtained (S602, S603). The correction parameter LUT that agrees with the combination of the standard image pickup apparatus information and the image pickup conditions of each image pickup apparatus is extracted from the database and is determined as the setting correction parameter (S605). The target image pickup apparatus of which the correction parameter LUT set at the previous time disagrees with the setting correction parameter is determined as the image pickup apparatus that needs the update of the correction parameter (S607). The setting correction parameter is sent to the image pickup apparatus that needs the update of the correction parameter (S608).

Accordingly, when the correction parameter is set to each image pickup apparatus, it is not necessary to select and set the correction parameter manually. Accordingly, human mistake in setting up a suitable correction parameter can be reduced.

Next, a second embodiment will be described. In the first embodiment, the correction parameter set to each image pickup apparatus is automatically selected on the basis of the image pickup conditions of each image pickup apparatus and the standard image pickup apparatus information. As compared with this, in the second embodiment of the present invention, a correction parameter is determined on the basis of a color chart pickup image picked up by each image pickup apparatus and standard image pickup apparatus information.

Figure 8:
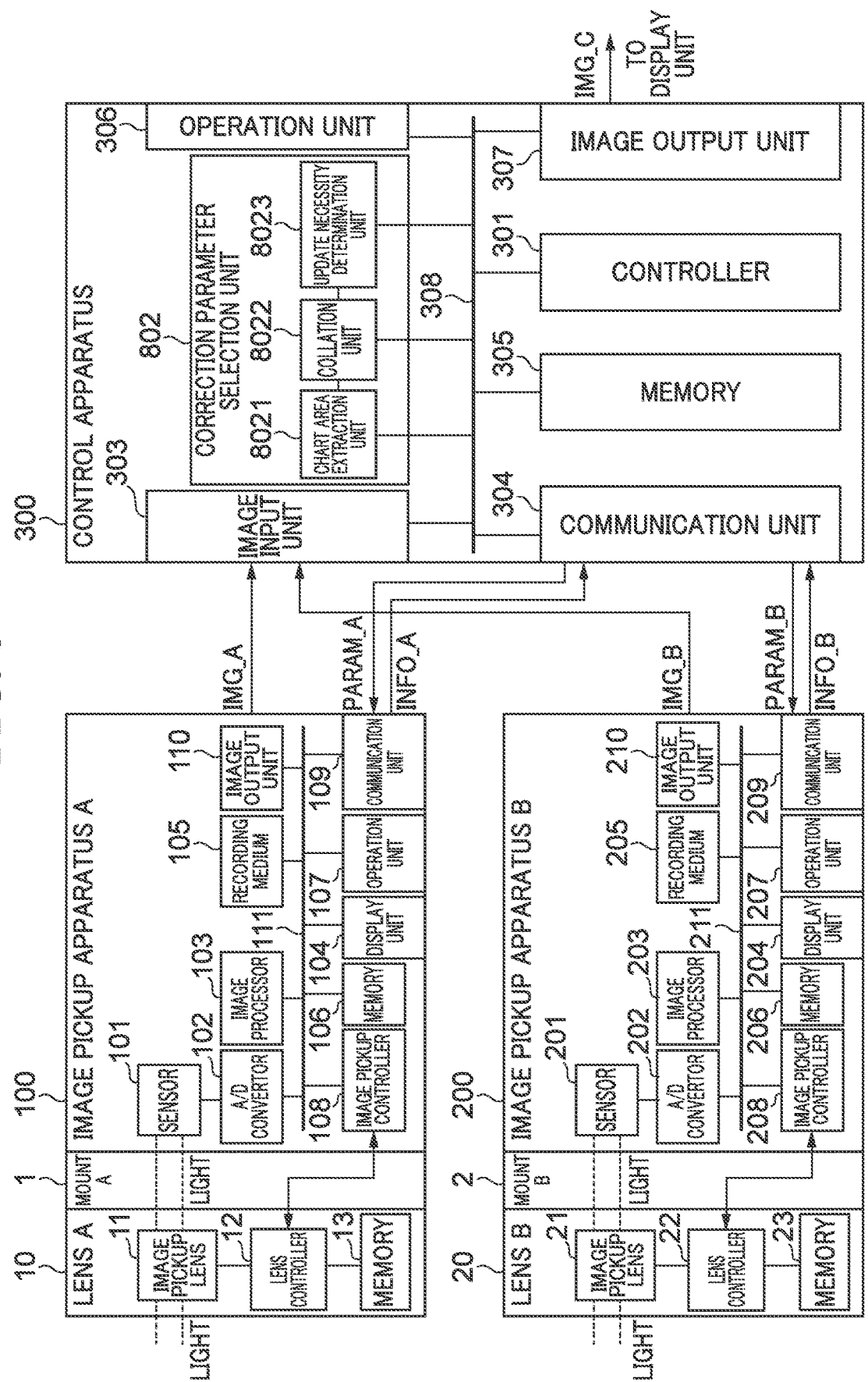
FIG. 8 is a block diagram showing a functional configuration example of an image pickup system according to a second embodiment in detail.

FIG. 8 is a block diagram showing a functional configuration example of an image pickup system according to the second embodiment in detail. This image pickup system is different from the first embodiment in a point that the color/luminance correction parameter selection unit 302 is replaced with a color/luminance correction parameter selection unit 802. The other configurations are identical to that of the first embodiment.

Figure 9:
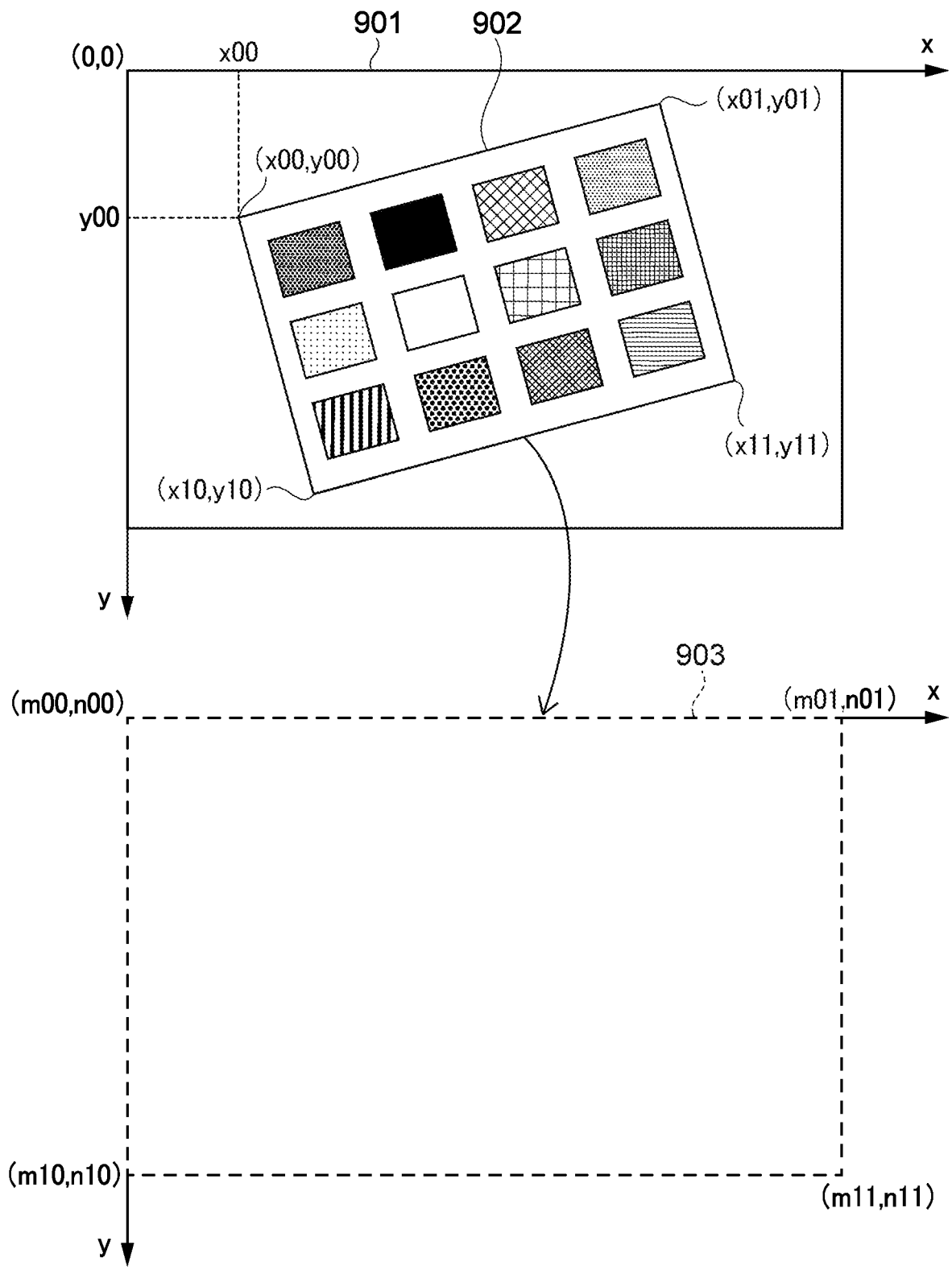
FIG. 9 is a view showing an example of a color chart pickup image.

The color chart 500 (FIG. 5) is used in this embodiment. As shown in FIG. 9 mentioned later, the control apparatus 300 automatically selects a suitable color/luminance correction parameter from the database on the basis of an extracted image obtained from an image of the color chart 500 picked up by each image pickup apparatus. The color/luminance correction parameter selection unit 802 has a chart area extraction unit 8021, a collation unit 8022, and an update necessity determination unit 8023.

FIG. 9 is a view showing an example of a color chart pickup image. How to generate a chart extraction image 903 (second chart image) from a color chart pickup image 901 will be described by referring to FIG. 9.

An image obtained by picking up the color chart 500 is the color chart pickup image 901. The color chart pickup image 901 includes a chart image area 902 corresponding to the color chart 500. The chart image area 902 may tilt. The chart extraction image 903 is generated by applying a rotation/distortion correction by projective transformation to the chart imaging area 902. The tilt is corrected in the chart extraction image 903.

A two-dimensional coordinate of which an origin (0, 0) is positioned at an upper left corner of the color chart pickup image 901 with a horizontal x-axis and a vertical y-axis is designed. Coordinates of an upper right corner, an upper right corner, a lower left corner, and a lower right corner of the chart image area 902 corresponding to the color chart 500 shall be (x00, y00), (x01, y01), (x10, y10), and (x11, y11), respectively. Each coordinate value is a pixel value in the pickup image. The chart area extraction unit 8021 cuts out the chart image area 902 enclosed by these four corners from the color chart pickup image 901.

Next, two-dimensional projective transformation is used in order to transform the chart image area 902 into an image of which the upper left corner matches the origin and that has no rotation and no distortion. When a coordinate before the projective transformation is (x, y) and a coordinate after the projective transformation is (m, n), the projective transformation is denoted by the following formulas (1) and (2).

$$m = a1(x-x00) + b1(y-y00)/a0(x-x00) + b0(y-y00) \quad \text{Formula (1)}$$

$$n = a2(x-x00) + b2(y-y00)/a0(x-x00) + b0(y-y00) \quad \text{Formula (2)}$$

How to calculate coefficients a0, a1, a2, b0, b1, and b2 included in the formulas (1) and (2) will be described. A coordinate (m00, n00) of an upper left corner of the chart extraction image 903 generated by the projective transformation is found by substituting the coordinate (x00, y00) of the upper left corner of the chart image area 902 before the transformation to (x, y) of the formulas (1) and (2). Similarly, coordinates of an upper right corner, a lower left corner, and a lower right corner of the chart extraction image 903 shall be (m01, n01), (m10, n10), and (m11, n11), respectively. These coordinates are found by substituting the corresponding coordinate values (x10, y10), (x01, y01), and (x11, y11) to (x, y) of the formulas (1) and (2).

An origin of the chart extraction image 903 generated by the projective transformation shall be (m00, n00) and its resolution is an FHD resolution (1920*1080 pixels). Accordingly, the coordinates of the respective corners after the projective transformation become (m00, n00)=(0, 0), (m01, n01)=(1920, 0), (m10, n10)=(0, 1080), and (m11, n11)=(1920, 1080). The coefficients a0, a1, a2, b0, b1, and b2 can be found by solving six formulas (except for the origin) corresponding to the respective corners generated through the above process simultaneously. A pixel (m, n) that is not found by this calculation, may be found by interpolation between surrounding pixel values.

Thereby, the chart area extraction unit 8021 generates the chart extraction image 903 on the basis of the color chart pickup image 901. The chart area extraction unit 8021 stores the generated chart extraction image 903 in the memory 305.

The collation unit 8022 collates the chart extraction image 903 corresponding to each image pickup apparatus stored in the memory 305 with an LUT database (FIG. 10), and determines the color/luminance correction parameter set to each image pickup apparatus.

FIG. 10 is a view showing an example of the LUT database. This LUT database associates a correction parameter LUT with a combination of standard image pickup apparatus information and a chart extraction image 903 (second chart image) obtained by picking up the color chart 500 by each image pickup apparatus. The LUT database is stored and held in the memory 305 and is referred by the collation unit 8022.

In the example shown in FIG. 10, the correction parameter LUTs are respectively associated with the chart extraction images 903 obtained by each image pickup apparatus in different illumination environment color temperatures. The correction parameter LUT1 and the correction parameter LUT2 are different only in the illumination environment color temperature and are identical in the other image pickup conditions. The correction parameter LUT3 uses the image pickup apparatus B 200 as the standard image pickup apparatus information under the same image pickup conditions as the correction parameter LUT1. The correction parameter LUT4 uses the image pickup apparatus B 200 as the standard image pickup apparatus information under the same image pickup conditions as the correction parameter LUT2.

The collation unit 8022 compares the chart extraction image 903, which is generated from the pickup image of the image pickup apparatus A 100 and is stored in the memory 305, with a chart extraction image group (first chart images, extraction images 1101 through 1104) corresponding to the image pickup apparatus A 100 in FIG. 10. Then, the collation unit 8022 detects a chart extraction image that is the smallest in color difference and luminance difference from the database.

Similarly, the collation unit 8022 compares the chart extraction image generated from the pickup image of the image pickup apparatus B 200 with the chart extraction images 1101 through 1104 corresponding to the image pickup apparatus B 200 in FIG. 10. Then, the collation unit 8022 detects a chart extraction image that is the smallest in color difference and luminance difference from the database. The collation unit 8022 or the controller 301 determines a color/luminance correction parameter LUT on the basis of these detection results and the standard image pickup apparatus information. The configuration of the update necessity determination unit 8023 is the same as that of the update necessity determination unit 3022 (FIG. 2).

Figure 11:
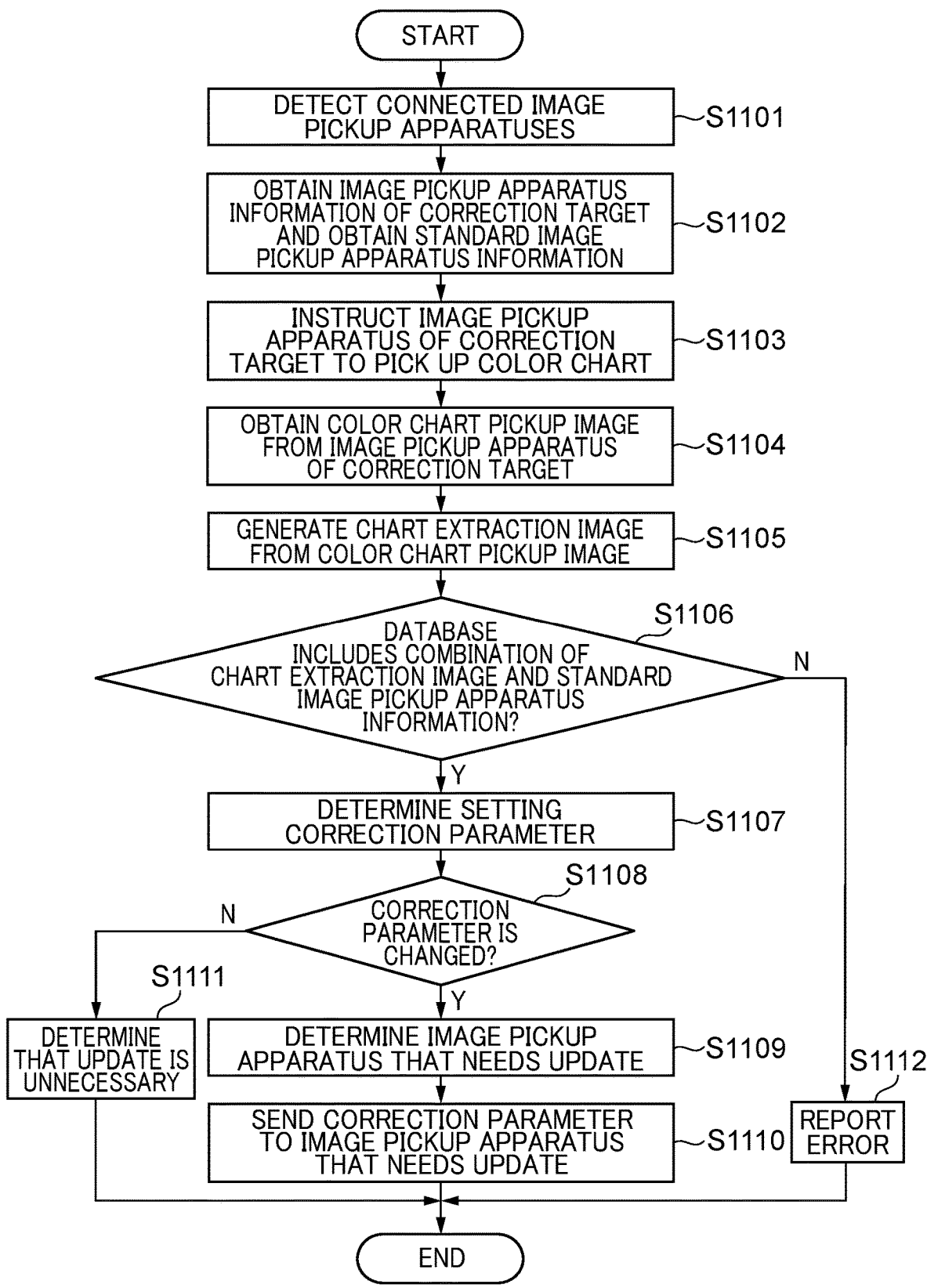
FIG. 11 is a flowchart showing a correction parameter output process.

FIG. 11 is a flowchart showing a correction parameter output process. This process is achieved when a CPU provided in the controller 301 develops the program stored in the memory 305 to a RAM provided in the controller 301 and runs it. This process is started when a user inputs an instruction to set or update a color/luminance correction parameter through the operation unit 306. In this process, the controller 301 plays roles of a first obtainment means, a third obtainment means, a determination means, and a control means.

In a step S1101, the controller 301 executes the process similar to the step S601 (FIG. 6). In a step S1102, the controller 301 obtains the standard image pickup apparatus information (first information) showing the standard image pickup apparatus at the present time and the target image pickup apparatus information (second information) showing the target image pickup apparatus that picks up the pickup image as the correction target at the present time. The standard image pickup apparatus and the target image pickup apparatus are selected from among the image pickup apparatuses detected in the step S1101.

FIG. 12 is a view showing an example of a selection screen for selecting a standard image pickup apparatus and a target image pickup apparatus. First, the controller 301 reads a selection image stored in the memory 305, and the image output unit 307 outputs this to the display apparatus 400. Thereby, the selection screen shown in FIG. 12 is displayed. In the example in FIG. 12, the IP addresses set to four image pickup apparatuses detected are displayed as a list.

A user designates a target image pickup apparatus and a standard image pickup apparatus by checking check boxes of the IP addresses of the desired image pickup apparatuses using the operation unit 306. In the state shown in FIG. 12, an image pickup apparatus of which the end of the IP address is "1" or "2" is a target image pickup apparatus, and an image pickup apparatus of which the end of the IP address is "1" is a standard image pickup apparatus. Thereby, the controller 301 can obtain the target image pickup apparatus information and the standard image pickup apparatus information. These pieces of obtained information are stored in the memory 305 of the control apparatus 300.

In the following description, the image pickup apparatus of which the end of the IP address is "1" shall be the image pickup apparatus A 100, the image pickup apparatus of which the end of the IP address is "2" is the image pickup apparatus B 200, and the image pickup apparatus of which the end the IP address is "3" or "4" shall be another image pickup apparatus (not shown).

Although the IP address is used as identification information about each image pickup apparatus in the second embodiment, the target image pickup apparatus information and standard image pickup apparatus information may be obtained by the same method as the first embodiment (FIG. 7). For example, an image pickup condition may be used as identification information about each image pickup apparatus.

In a step S1103, the controller 301 transmits an instruction signal to each target image pickup apparatus through the communication unit 304 so as to perform a process for picking up the color chart 500. Specifically, the controller 301 transmits parameters PARAM_A including the instruction signal to the image pickup apparatus A 100 and transmits parameters PARAM_B including the instruction signal to the image pickup apparatus B 200. In that time, the user arranges the color chart 500 beforehand so that each image pickup apparatus can pick up the color chart 500.

When receiving the PARAM_A, the communication unit 109 of the image pickup apparatus A 100 transmits the instruction signal to the image pickup controller 108. The image pickup controller 108 receives the instruction signal and controls each block to pick up the color chart 500. The pickup image of the color chart 500 is stored in the memory 106. The image pickup apparatus B 200 picks up the color chart 500 similarly.

In a step S1104, the communication unit 304 obtains a pickup image (color chart pickup image 901) from each target image pickup apparatus according to an instruction from the controller 301. Each image pickup apparatus outputs a pickup image stored in each memory from each image output unit and transmits it to the communication unit 304 of the control apparatus 300. The pickup image of the image pickup apparatus A 100 is received as IMG_A and the pickup image of the image pickup apparatus B 200 is received as IMG_B, and they are stored in the memory 305.

In a step S1105, the chart area extraction unit 8021 cuts out a chart image area 902 from a color chart pickup image 901 of each image pickup apparatus and generates a chart extraction image 903 by applying a rotation/distortion correction according to an instruction from the controller 301 by the above-mentioned method. The generated chart extraction image 903 is stored in the memory 305.

In a step S1106, the controller 301 determines whether the LUT database shown in FIG. 10 includes the combination of each chart extraction image 903 obtained in the step S1105 and the standard mage pickup apparatus information obtained in the step S1102. Then, when determining that the LUT database includes the above-mentioned combination, the controller 301 proceeds with the process to a step S1107. When determining that the LUT database does not include the above-mentioned combination, the controller 301 proceeds with the process to a step S1112.

In the step S11107, the controller 301 determines the setting correction parameter. That is, the controller 301 determines the specified correction parameter LUT that agrees with the above-mentioned combination as the setting correction parameter. For example, the chart extraction image 903 obtained by the image pickup apparatus B 200 shall agree with the extracted image 1101 in a state where the standard image pickup apparatus information shows the image pickup apparatus A 100 and the target image pickup apparatus is the image pickup apparatus B 200. In such a case, the controller 301 determines the correction parameter LUT3 as the setting correction parameter.

The process in the steps S1107 through S1112 is the same as the process in the steps S605 through S610 in FIG. 6.

According to the embodiment, the LUT database that associates a correction parameter LUT for every combination of standard image pickup apparatus information and a chart extraction image 903 (second chart image) is held in the memory 305 (FIG. 10). The correction parameter LUT that agrees with the combination of the standard image pickup apparatus information and the chart extraction image 903 is extracted from the database and is determined as the setting correction parameter (S1107). The target image pickup apparatus of which the correction parameter LUT set at the previous time disagrees with the setting correction parameter is determined as the image pickup apparatus that needs the update of the correction parameter (S1109). The setting correction parameter is sent to the image pickup apparatus that needs the update of the correction parameter (S1110).

Accordingly, when the correction parameter is set to each image pickup apparatus, it is not necessary to select and set the correction parameter manually. Accordingly, the effect similar to the first embodiment can be obtained about the reduction of the human mistake in setting up a suitable correction parameter.

In the embodiment, when the tilt of the chart image area 902 can be disregarded or can be canceled by another method, it is dispensable to apply the projective transformation. Accordingly, an image used for combination with the standard image pickup apparatus information in the step S1106 may be the color chart pickup image 901 or the chart image area 902.

The above-mentioned embodiments may be modified as follows. When at least one target image pickup apparatus is determined that the update is required, the setting correction parameter may be sent to all the target image pickup apparatuses in the steps S606 through S608 in FIG. 6 and the steps S1108 through S1110 in FIG. 11.

Although the color/luminance correction parameter is applied to each image pickup apparatus in each of the above-mentioned embodiments, this is not the only way. For example, in the control apparatus 300, a correction parameter may be applied to a pickup image obtained from each image pickup apparatus. The controller 301 or an image processor provided for exclusive use may apply a correction parameter to each pickup image.

When a correction parameter is applied to each pickup image in the control apparatus 300, color and luminance can be corrected even in an image pickup apparatus that does not have a correction parameter application function.

Alternatively, the control apparatus 300 may transmit a color/luminance correction parameter of each image pickup apparatus to the display apparatus 400, and the color/luminance correction parameter may be applied to a display image in the display apparatus 400.

It should be noted that the controller 301 may add information showing a setting correction parameter to an image picked up by a target image pickup apparatus after the setting correction parameter is set up. For example, when a pickup image to which each image pickup apparatus applies a correction parameter is saved in a recording medium, the controller 301 may add the information showing a content of the applied correction parameter to the pickup image as metadata, for example.

Since standard image pickup apparatus information is associated with a correction parameter name in the databases shown in FIG. 4 and FIG. 10, a correction parameter name may be added to a pickup image as metadata. For example, the correction parameter name "LUT1" is given as metadata to the pickup image after the color/luminance correction. It should be noted that additional information is not restricted to metadata.

The memory 305 may hold a plurality of sets of databases (FIG. 4, FIG. 10) for respective image pickup scenes. When determining the setting correction parameter, the controller 301 may selectively use a set of databases on the basis of designation from a user. For example, when databases are held for respective image pickup scenes, two patterns of databases for studio image pickup (indoor) and location image pickup (outdoor) are prepared and held. Then, when the setting correction parameter is determined, the database selected by the user may be referred. The plurality of sets of held databases may not be prepared for the image pickup scenes.

Moreover, the controller 301 may present a recommended image pickup condition to the user with the display apparatus 400 when the user chooses an image pickup scene. The recommended image pickup condition may be stored in the memory 305 beforehand as an image pickup condition often used when a certain image pickup scene is chosen.

The start timing of the correction parameter output process (FIG. 6, FIG. 11) is not limited to a timing at which an instruction for setting or updating the correction parameter is received from the user. For example, the control apparatus 300 may obtain the image pickup conditions of each image pickup apparatus at predetermined timings (for example, periodically). And the control apparatus 300 may start a determination process for the setting correction parameter when an image pickup condition of any one of image pickup apparatuses varies from the previous time.

That is, the controller 301 may execute the process from the step S603 or the process from the step S1102, when an image pickup condition varies. Alternatively, the controller 301 may display a message that prompts the user to execute the correction parameter output process (FIG. 6 or FIG. 11) on the display apparatus 400 when an image pickup condition of each image pickup apparatus varies. In this way, the suitable update timing of the color/luminance correction parameter can be presented to the user by always monitoring the variation of an image pickup condition of each image pickup apparatus.

It should be noted that the color/luminance correction parameters of all the image pickup apparatuses may be updated every time without performing the process of the update necessity determination unit 3022 or 8023.

Next, a third embodiment will be described. Although the system in which the control apparatus 300 corrects the color difference between the image pickup apparatuses is described as an example in the first and second embodiments mentioned above, the system configuration is not necessarily limited to this configuration. In the third embodiment, the image pickup apparatus A 100 also plays the role of the control apparatus 300. In this case, the database in FIG. 4 etc. is held in the memory 106 of the image pickup apparatus A 100. The image pickup apparatus A 100 obtains information about itself as the standard image pickup apparatus information and information about the image pickup apparatus B 200 as the target image pickup apparatus information. And then, the image pickup apparatus A 100 determines a correction parameter by referring to the database. The image pickup apparatus B 200 in place of the image pickup apparatus A 100 may also play the role of the control apparatus 300.

Next, a fourth embodiment will be described. In the above-mentioned first embodiment, the correction parameter set to each image pickup apparatus is automatically selected on the basis of the model numbers and serial numbers of each image pickup apparatus and each lens, and the illumination environment color temperature of each image pickup apparatus as the image pickup conditions of each image pickup apparatus and the standard image pickup apparatus information.

When the correction parameter set to each image pickup apparatus becomes automatically selectable using the first embodiment, many correction parameters corresponding to various image pickup environments are assumed to be prepared.

In this case, when the image pickup conditions are limited to the conditions in the first embodiment, many table data having the same image pickup conditions and the same standard image pickup apparatus information are assumed to be generated.

In the fourth embodiment, a light source type, an image pickup time zone (morning, daytime, or night), image pickup month/year, an image pickup location, an important color in image pickup, and a pickup object type are used as image pickup conditions obtained from an image pickup apparatus in addition to the image pickup conditions used in the first embodiment. The configuration of the image pickup system in this embodiment is the same as the configuration shown in FIG. 2.

The light source type shows the type of a light source, such as sunlight, a fluorescent lamp, a LED lamp, or a halogen lamp. For example, the type of light source can be easily obtained by using light source information recognized by an image pickup apparatus. When the light source used in picking up an image is specified, cases where spectral characteristics of light sources differ in the same illumination environment color temperature can be discriminated, which reduces misselection of the correction parameter selected automatically.

The information about the image pickup time zone enables discrimination of the time zones of image pickup, such as morning, daytime, and night. In outdoor image pickup, a color tone of sky varies from morning to daytime. Such a variation may cause misselection of the correction parameter selected automatically. Use of the information about the image pickup time zone can reduce the misselection caused by the variation.

The information about the image pickup month/year enables discrimination of actual image pickup month/year. The correction parameter can be automatically selected on the basis of the information about the image pickup month/year that is difficult to designate by a season, such as spring, summer, fall, or winter.

The information about the image pickup location enables discrimination of an actual image pickup location. The location can be specified by using a GPS device installed in an image pickup apparatus or a control apparatus that cooperates with the image pickup apparatus. Use of the information about the image pickup location enables automatic selection of a correction parameter for correcting color tone variation due to difference between outdoor and indoor and color tone variation due to difference in geographical conditions (latitude and longitude).

The information about the important color in image pickup shows a color regarded as important by an image pickup apparatus in picking up an image. An image analysis calculator, such as an image processing IC or a CPU mounted in an image pickup apparatus, analyzes an image and detects a color regarded as important in the image. For example, when a person's face is displayed in most of the image, it is determined that a flesh color is the important color in the image pickup, and a correction parameter is automatically selected.

The information about the object type of an image pickup object shows an object regarded as important by an image pickup apparatus in picking up an image. An image analysis calculator, such as an image processing IC or a CPU mounted in an image pickup apparatus, analyzes an image and detects an image pickup object. For example, when a person's face is displayed in most of the image, it is determined that the image pickup object is the person's face, and a correction parameter is automatically selected.

FIG. 13A and FIG. 13B are the views showing an example of the database in this embodiment. The database in this embodiment is divided into two tables as shown in FIG. 13A and FIG. 13B due to an issue of space. The database is stored and held in the memory 305 as a holding means and is referred by the collation unit 3021.

When the many image pickup conditions obtained from an image pickup apparatus are used in this way, a parameter is automatically selectable even if the number of the correction parameters increases because the number of kinds of the information for selecting the parameter increases. This reduces misselection caused by a human operation.

Next, a fifth embodiment will be described. In the first embodiment mentioned above, the correction parameter set to each image pickup apparatus is automatically selected on the basis of the image pickup conditions of each image pickup apparatus and the standard image pickup apparatus information.

When the correction parameter set to each image pickup apparatus becomes automatically selectable using the first embodiment, the number of correction parameters of the managed database is assumed to increase because many correction parameters corresponding to various image pickup environments are prepared.

Accordingly, since the size of the entire database becomes large, the configuration in which the image pickup apparatus B 200 also plays the role of the control apparatus 300 described in the third embodiment becomes difficult to achieve when hardware resources, such as a memory, are restricted.

Accordingly, a required correction parameter is extracted from the database in picking up an image in this embodiment. When the image pickup apparatus B 200 of which the hardware resources are restricted also plays the role of the control apparatus 300, required correction parameters are extracted from the database and the extracted correction parameters are gathered into one. This can reduce a user's complicatedness.

FIG. 14 is a schematic view showing a correction parameter structure that combines two sets of the correction parameters of a 3D-LUT structure. FIG. 14 is the schematic view showing a case where two different correction parameters 1400 and 1401 are combined to create a file.

Since the correction parameters are combined to create a file in this way, the image pickup apparatus B 200 manages the single file when the image pickup apparatus B 200 also plays the role of the control apparatus 300, which can reduce a user's complicatedness.

Moreover, there is an existing file format of the correction parameter of the 3D-LUT structure that allows only one correction parameter to be input into a file. In this case, if a plurality of correction parameters are combined to create a file, compatibility with the existing file format will be lost.

In order to cope with this issue, it is considerable to create a file including the second correction parameter 1401 in FIG. 14 as a comment sentence of the existing file format so as to maintain the compatibility with the existing file format.

When the file including the comment sentence of the existing file format is created, the control apparatus 300 recognizes the correction parameter written as the comment sentence and automatically selects the correction parameter to be set up.

In this way, when a plurality of correction parameters are gathered into a file by combining data while maintaining the compatibility with the existing file format, the file including the plurality of correction parameters can be treated by an existing image pickup apparatus.

Next, a sixth embodiment will be described. In the first embodiment mentioned above, the correction parameter set to each image pickup apparatus is automatically selected on the basis of the image pickup conditions of each image pickup apparatus and the standard image pickup apparatus information.

Even if a correction parameter set to each image pickup apparatus becomes automatically selectable using the first embodiment, a case where the database does not include a suitable correction parameter is also assumed.

Particularly, when the image pickup apparatus B 200 also plays the role of the control apparatus 300 as described in the third embodiment mentioned above, it is necessary to make the database small. When the database is made small, the case where the database does not include the suitable correction parameter may occur.

In this embodiment, a correction parameter suitable to an image pickup environment is generated from a plurality of correction parameters, which are included in the database and have similar image pickup conditions, and the generated correction parameter is automatically selected.

FIG. 15 shows an example of a database to which information showing whether a stored correction parameter is usable for interpolation is added. In the database in FIG. 15, the information that determines usage of an LUT beforehand is stored for every correction parameter. A correction parameter corresponding to an image pickup condition that is not included in the database can be generated using correction parameters of which the usage is set to "interpolation". A correction parameter of which the usage is set to "selection" is not used for generating a correction parameter by interpolation.

For example, when the illumination environmental color temperatures of the image pickup conditions of the image pickup apparatus A 100 and image pickup apparatus B 200 are 5000K, a correction parameter at the illumination environmental color temperature 5000K is generated using LUT1 and LUT3 of which the usage is set to "interpolation" in the database shown in FIG. 15.

A CPU mounted in the control apparatus 300 generates this correction parameter by interpolation calculation based on the illumination environment color temperature 6000K of the LUT1 and the illumination environment color temperature 3000K of the LUT3. When the correction parameter at 5000K is generated, linear interpolation of the correction parameters at 6000K and 3000K may be employed as an algorithm of interpolation calculation. The algorithm is not restricted to this correction calculation.

In this way, a correction parameter that is not included in the database can be generated and can be automatically selected by adding the information showing that a correction parameter managed by the database can be used for the interpolation calculation.

Next, a seventh embodiment will be described. As described in the fifth embodiment mentioned above, when the database size becomes large, the configuration in which the image pickup apparatus B 200 also plays the role of the control apparatus 300 becomes difficult to achieve when hardware resources, such as a memory, of the image pickup apparatus B 200 are restricted.

In this embodiment, the database is managed while reducing a correction parameter size by unifying correction parameters and by compressing data.

In this case, the control apparatus 300 that manages the database performs average calculation and difference calculation of a plurality of correction parameters by discrete wavelet transformation etc. to compress the data.

For example, a plurality of correction parameters, which have the 3D-LUT structure and have the same number of correction steps, are extracted from the database, and the correction data of the same number of steps are compared. The correction parameter size can be reduced by the discrete wavelet transformation using average calculation and difference calculation.

Moreover, as a different compression method, a plurality of correction parameters are extracted from the database and are compressed. The correction parameters can also be compressed in a plurality of units.

Moreover, as a different compression method, the data size of the correction parameter can be reduced by decreasing the number of steps of the correction parameter of the 3D-LUT structure. For example, when the number of steps of the correction parameter of the 3D-LUT structure is decreased from 65 steps to 33 steps without changing a bit width of the correction data, the data size is reduced to about 13%.

Moreover, when a plurality of databases are compressed collectively, the correction parameters used for the image pickup in a day are extracted from the database and are compressed as mentioned above. Thereby, even when the hardware resources, such as the memory, of the control apparatus 300 is restricted, the database including the plurality of correction parameters can be managed. The correction parameters in a compression state are used after decompression if needed.

Although the present invention has been described in detail on the basis of the suitable embodiments, the present invention is not limited to these specific embodiments, and various configurations that do not deviate from the scope of the present invention are also included in the present invention. Parts of the above-mentioned embodiments may be combined suitably.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2021-198716, filed Dec. 7, 2021 and No. 2022-180932, filed Nov. 11, 2022, which are hereby incorporated by reference herein in their entireties.

What is claimed is:

1. A control apparatus comprising:
a database configured to hold correction parameters for correcting pickup images so as to reduce color difference between pickup images of image pickup apparatuses in association with combinations of information showing a standard image pickup apparatus among the image pickup apparatuses and image pickup conditions of the image pickup apparatuses;
a memory device that stores a set of instructions; and
at least one processor that executes the set of instructions to:
obtain first information showing a standard image pickup apparatus at a present time among the image pickup apparatuses and second information showing a target image pickup apparatus that picks up a pickup image as a correction target at the present time;
obtain the image pickup conditions of the image pickup apparatuses;
determine a setting correction parameter that is set to the target image pickup apparatus shown by the second information from the database based on the first information obtained and the image pickup conditions of the image pickup apparatuses obtained; and
output the setting correction parameter determined.

2. The control apparatus according to claim 1, wherein at least one processor that executes the set of instructions to output, in a case where the setting correction parameter is determined, the setting correction parameter updated based on a correction parameter set to the target image pickup apparatus at a previous time and the setting correction parameter determined at the present time.

3. The control apparatus according to claim 2, wherein at least one processor that executes the set of instructions to:
determine necessity of update of the setting correction parameter for every target image pickup apparatus; and
send the setting correction parameter updated to a target image pickup apparatus that is determined to need the update,
wherein the setting correction parameter updated is not sent to a target image pickup apparatus that is determined not to need the update.

4. The control apparatus according to claim 3, wherein at least one processor that executes the set of instructions to report a determination result about the necessity of the update.

5. The control apparatus according to claim 1, wherein at least one processor that executes the set of instructions to:
   display information showing the image pickup apparatuses on a screen; and
   obtain the first information and the second information are obtained by prompting a user to designate the standard image pickup apparatus and the target image pickup apparatus on the screen.

6. The control apparatus according to claim 1, wherein at least one processor that executes the set of instructions to add information showing the setting correction parameter to an image picked up by the target image pickup apparatus after setting the setting correction parameter.

7. The control apparatus according to claim 1, wherein the database holds sets of the correction parameters, and
   wherein at least one processor that executes the set of instructions to use the sets of the correction parameters selectively based on designation from a user in a case where the setting correction parameter is determined.

8. The control apparatus according to claim 1, wherein at least one processor that executes the set of instructions to:
   obtain the image pickup conditions of the image pickup apparatuses at predetermined timings; and
   start a determination process for the setting correction parameter in a case where an image pickup condition of any one of the image pickup apparatuses varies from a previous time.

9. The control apparatus according to claim 1, wherein at least one processor that executes the set of instructions to prompt a user to generate a correction parameter corresponding to a combination of the image pickup conditions of the image pickup apparatuses obtained and the first information obtained in a case where the database does not include the combination.

10. The control apparatus according to claim 1, wherein the image pickup conditions include at least one of information about a body of each of the image pickup apparatuses, information about a lens attached to each of the image pickup apparatuses, and information about illumination environment color temperature of each of the image pickup apparatuses.

11. The control apparatus according to claim 1, wherein the image pickup conditions include at least one of a light source type, an image pickup time zone, image pickup month/year, an image pickup location, an important color, and a pickup object type of each of the image pickup apparatuses.

12. The control apparatus according to claim 1, wherein at least one processor that executes the set of instructions to:
   hold a set of the correction parameters as a file; and
   extract, in a case where the setting correction parameter is determined, the setting correction parameter determined from the correction parameters held in the file; and output the setting correction parameter extracted.

13. The control apparatus according to claim 1, wherein at least one processor that executes the set of instructions to: generate, in a case where the database does not include the combination of the obtained image pickup conditions of the image pickup apparatuses and the obtained first information, a correction parameter from the correction parameters that are included in the database and have similar image pickup conditions; and determine the correction parameter generated,
   wherein the correction parameters that have the similar image pickup conditions are allowed to generate interpolation data.

14. The control apparatus according to claim 1, wherein at least one processor that executes the set of instructions to:
   hold the correction parameters in a compression state; and
   output, in the case where the setting correction parameter is determined, the setting correction parameter determined after decompressing the correction parameter held in the compression state.

15. The control apparatus according to claim 14, wherein the correction parameters are compressed by at least one of data compression by decreasing a number of steps of the correction parameters and data compression by applying discrete wavelet transformation to relationship of the correction parameters.

16. A control apparatus comprising:
   a database configured to hold correction parameters for correcting pickup images so as to reduce color difference between pickup images of image pickup apparatuses in association with combinations of information showing a standard image pickup apparatus among the image pickup apparatuses and first chart images obtained by picking up a color chart by the image pickup apparatuses in generating the correction parameters;
   a memory device that stores a set of instructions; and
   at least one processor that executes the set of instructions to:
   obtain first information showing a standard image pickup apparatus at a present time and second information showing a target image pickup apparatus that picks up a pickup image as a correction target at the present time;
   obtain second chart images obtained by picking up the color chart by the image pickup apparatuses including the standard image pickup apparatus at the present time and the target image pickup apparatus at the present time;
   determine a setting correction parameter that is set to the target image pickup apparatus shown by the second information from the database based on the first information obtained and the second chart images obtained; and
   output the setting correction parameter determined.

17. A control method for a control apparatus, the control method comprising:
   holding correction parameters for correcting pickup images so as to reduce color difference between pickup images of image pickup apparatuses into a database in association with combinations of information showing a standard image pickup apparatus among the image pickup apparatuses and image pickup conditions of the image pickup apparatuses;
   obtaining first information showing a standard image pickup apparatus at a present time among the image pickup apparatuses and second information showing a target image pickup apparatus that picks up a pickup image as a correction target at the present time;
   obtaining the image pickup conditions of the image pickup apparatuses;
   determining a setting correction parameter that is set to the target image pickup apparatus shown by the second information from the database based on the first information obtained and the image pickup conditions of the image pickup apparatuses obtained; and
   outputting the setting correction parameter determined.

18. A control method for a control apparatus, the control method comprising:

holding correction parameters for correcting pickup images so as to reduce color difference between pickup images of image pickup apparatuses in association with combinations of information showing a standard image pickup apparatus among the image pickup apparatuses and first chart images obtained by picking up a color chart by the image pickup apparatuses in generating the correction parameters;

obtaining first information showing a standard image pickup apparatus at a present time and second information showing a target image pickup apparatus that picks up a pickup image as a correction target at the present time;

obtaining second chart images obtained by picking up the color chart by the image pickup apparatuses including the standard image pickup apparatus at the present time and the target image pickup apparatus at the present time;

determining a setting correction parameter that is set to the target image pickup apparatus shown by the second information from the database based on the first information obtained and the second chart images obtained; and outputting the setting correction parameter determined.

19. A non-transitory computer-readable storage medium storing a control program causing a computer to execute a control method for a control apparatus, the control method comprising:

holding correction parameters for correcting pickup images so as to reduce color difference between pickup images of image pickup apparatuses into a database in association with combinations of information showing a standard image pickup apparatus among the image pickup apparatuses and image pickup conditions of the image pickup apparatuses;

obtaining first information showing a standard image pickup apparatus at a present time among the image pickup apparatuses and second information showing a target image pickup apparatus that picks up a pickup image as a correction target at the present time;

obtaining the image pickup conditions of the image pickup apparatuses;

determining a setting correction parameter that is set to the target image pickup apparatus shown by the second information from the database based on the first information obtained and the image pickup conditions of the image pickup apparatuses obtained; and outputting the setting correction parameter determined.

20. A non-transitory computer-readable storage medium storing a control program causing a computer to execute a control method for a control apparatus, the control method comprising:

holding correction parameters for correcting pickup images so as to reduce color difference between pickup images of image pickup apparatuses in association with combinations of information showing a standard image pickup apparatus among the image pickup apparatuses and first chart images obtained by picking up a color chart by the image pickup apparatuses in generating the correction parameters;

obtaining first information showing a standard image pickup apparatus at a present time and second information showing a target image pickup apparatus that picks up a pickup image as a correction target at the present time;

obtaining second chart images obtained by picking up the color chart by the image pickup apparatuses including the standard image pickup apparatus at the present time and the target image pickup apparatus at the present time;

determining a setting correction parameter that is set to the target image pickup apparatus shown by the second information from the database based on the first information obtained and the second chart images obtained; and outputting the setting correction parameter determined.

* * * * *